United States Patent [19]
Kataoka et al.

[11] Patent Number: 5,280,538
[45] Date of Patent: Jan. 18, 1994

[54] SPREAD SPECTRUM DEMODULATOR

[75] Inventors: Nobuhisa Kataoka; Toshiharu Kojima, both of Kamakura, Japan

[73] Assignee: Mitsubishi Denki Kabushiki Kaisha, Tokyo, Japan

[21] Appl. No.: 838,503

[22] Filed: Feb. 18, 1992

[30] Foreign Application Priority Data

Feb. 22, 1991 [JP] Japan .................. 3-28582

[51] Int. Cl.$^5$ .................. H04L 27/30
[52] U.S. Cl. .................. 375/1; 380/34; 375/83; 329/304; 329/306; 329/307
[58] Field of Search .................. 375/1, 83–87; 380/34; 329/304, 306, 307

[56] References Cited

U.S. PATENT DOCUMENTS

| | | | |
|---|---|---|---|
| 4,122,393 | 10/1978 | Gordy et al. | 375/1 |
| 4,769,816 | 9/1988 | Hochstadt et al. | 329/304 X |
| 4,859,956 | 8/1989 | Mizoguchi | 329/304 |
| 4,859,959 | 8/1989 | Sharpe | 329/306 |
| 4,888,793 | 12/1989 | Chanroo et al. | 375/84 |
| 5,001,724 | 3/1991 | Birgenbeier et al. | 329/304 X |

FOREIGN PATENT DOCUMENTS 2-301336 12/1990 Japan .................. H04J 13/00

OTHER PUBLICATIONS

R. C. Dixon, *Spread Spectrum Systems*; (John Wiley & Sons, 1984), pp. 254–257.
Ushiyama et al, "High Precision Baseband Delay-Lock Loop"; Proc's of the Spring 1990 Meeting of the Assoc. of Electric Info. Communications, (In Japanese), p. 2-248.
Ikegami et al, "Experiments on Spread Spectrum Mobile Satellite Communication with Coherent Matched Filter Receiver"; Proc's of IEEE Int'l Symp. on Spread Spectrum Techniques & Appl's, pp. 158–163; Sep. 1990.

*Primary Examiner*—Bernarr E. Gregory
*Attorney, Agent, or Firm*—Wolf, Greenfield & Sacks

[57] ABSTRACT

A spread spectrum demodulator for use with a phase-shift-keying modulated spread spectrum signal used in mobile satellite communications. An objective of the spread spectrum demodulator is to perform tracking by producing from a correlation pulse signal an error signal having a time discrimination characteristic. The spread spectrum demodulator generates from the correlation pulse signal an error signal whose level varies in response to a phase difference between a pseudonoise signal contained in a received signal and a reference pseudonoise signal. A clock in synchronism with the received signal is generated from this error signal, thereby demodulating the received signal.

11 Claims, 20 Drawing Sheets

EXAMPLE OF k = 1

SPREAD SPECTRUM DEMODULATOR

BACKGROUND OF THE INVENTION

1. Field of the Invention

This invention relates to a spread spectrum demodulator of a direct sequence type spread spectrum system.

2. Description of Related Arts

A spread spectrum demodulator for use with a phase-shift-keying modulated spread spectrum signal disclosed, for example in the article entitled "YOKOYAMA SPREAD SPECTRUM COMMUNICATION SYSTEM" by Kagaku Gijyutsu Syuppan Sha (in 1988), has been known as a spread spectrum demodulator of the conventional direct sequence type spread spectrum system. FIG. 16 of the accompanying drawings diagrammatically represents a block diagram of the conventional spread spectrum demodulator.

In the drawing, reference numeral 1 designates a received signal; 2, an initial acquisition circuit for generating from the received signal a signal (hereinafter referred to as acquired signal) which represents a breakpoint of information data bits; 3, an acquired signal; 4, a tracking circuit for effecting tracking in response to the acquired signal; 5, a reproduced pseudo noise signal (hereinafter referred to as PN signal); 6, a mixer for multiplying the received signal by the reproduced PN signal; 7, a despreading section comprised of the initial acquisition circuit 2, the tracking circuit 4, and the mixer 6; 8, a despread signal which does not contain a PN signal component; 9, a PSK demodulator; and 10, demodulated data.

The outline of the operation of the demodulator shown in FIG. 16 will now be described. Assuming that the received signal is a spread spectrum signal whose carrier wave, having a frequency of $\omega_0$, is modulated by BPSK (Binary Phase-shift Keying), the spread spectrum signal is then expressed as $$d(t)c(t)\cos\omega_0 t \quad (1).$$

In this equation, $d(t)$ is an information data signal having a bit width of Td and is designated as a rectangular wave signal having a value of $-1$ or $+1$, and $c(t)$ is a PN signal (hereinafter, one bit of the PN signal is called a chip) having the bit width of Tc and is designated as a rectangular wave signal having a value of $-1$ or $+1$. N chips of the PN signals constite one cycle of a M series code. Spreading one bit of information data with one cycle of the PN signal results in Td=NTc.

The initial acquisition circuit 2 detects from the received signal 1 a timing signal corresponding to a breakpoint of the information data bits and outputs the thus detected timing signal to the tracking circuit 4 as the acquired signal 3. The tracking circuit 4 generates the reproduced PN signal 5 from the acquired signal 3. Despite the fact that the reproduced PN signal 5 is out of phase with the PN signal included in the received signal 1 before a time when the acquired signal 3 is received, namely, c (t+$\tau$), the tracking circuit 4 generates the reproduced PN signal 5 in synchronism with the received signal of $\tau=0$ based on the timing when the acquired signal 3 is received, and thereafter tracks the status of $\tau=0$.

The multiplier 6 multiplies the received signal 1 by the reproduced PN signal 5, which results in $c(t)\times c(t)=1$. Hence, there will be obtained the despread signal 8 which does not contain the PN signal component the despread signal being expressed as $$d(t) \cos \omega_0 t \quad (2)$$

The general PSK demodulator 9 demodulates the despread signal 8 and produces the demodulated data 10.

The feature of the spread spectrum demodulator lies in the despreading section 7 comprised of the initial acquisition circuit 2, the tracking circuit 4, and the mixer 6. The initial acquisition circuit 2 and the tracking circuit 4 both of which are components of the despreading section 7 will now be described with reference to FIGS. 17, 18, and 19.

FIG. 17 shows the structure of the initial acquisition circuit of the conventional spread spectrum demodulator disclosed in the book entitled "SPREAD SPECTRUM COMMUNICATIONS, Vol. 3", by M. K. Simon, COMPUTER SCIENCE PRESS (1985).

In the drawing, reference numeral 1 designates the received signal; 11, a carrier wave generator; 12A and 12B, mixers; 13A and 13B, low pass filters (LPF); 13a, a base band signal generated using the carrier wave which was generated by the carrier wave generator 11; 13b, a base band signal generated by use of the Carrier wave having a phase delay of 90°; 14A and 14B, sampling circuits for sampling the base band signals 13a and 13b, respectively; 14a and 14b; sampled signals, each sampled by the sampling circuit; 15A and 15B, correlators for correlating the sampled signals 14a and 14b with a PN signal (hereinafter, referred to as reference PN signal) which has been preset by the demodulator; 15a and 15b, correlation signals outputted from the correlators; 15A and 15B respectively; 16A and 16B, square generators for producing a square of each of the correlation signals 15a and 15b; 17, a phase shifter for causing a 90° phase delay of the carrier wave outputted from the carrier wave generator 11; 23, an adder for adding the squares of the correlation signals produced by the square generators 16A and 16B; 24, a correlation pulse signal outputted from the adder 23; and 25, a decision device for generating the acquired signal 3 by deciding on phase matching of the PN signal components included in the received signal 1 and the reference PN signal.

The operation of the initial acquisition circuit shown in FIG. 17 will now be described.

The function of the initial acquisition circuit is to generate the acquired signal 3 at a timing such that the PN signal included in the received signal 1 that was received with distortions due to adverse noise effects of along the transmission path is in phase with the reference PN signal. This is achieved by comparing these two signals.

Given that a phase difference between a carrier wave of the received signal 1 and a carrier wave outputted from the carrier wave generator 11 is $\theta$, the carrier wave outputted from the carrier wave generator can be expressed as $$\cos(\omega_0 t + \theta).$$

In the meantime, a carrier wave outputted by way of the 90° phase shifter 17 is $$\sin(\omega_0 t + \theta).$$

The received signal 1 is divided into two, and the one signal is multiplied by the carrier wave $\cos(\omega_0 t + \theta)$ which is outputted from the carrier wave generator 11 by means of the mixer 12A, then converted by means of the low pass filter 13A into the base band signal 13a which includes $\cos\theta$ components. The other signal is multiplied by the carrier wave $\sin(\omega_0 t + \theta)$ that is outputted by way of the 90° phase shifter 17 by means of the mixer 12B, then converted by means of the low pass filter 13B into the base band signal 13b which includes $\sin\theta$ components.

The base band signals 13a and 13b are sampled by the sampling circuits 14A and 14B, and transmitted to the correlators 15A and 15B, respectively.

Because of the use of an asynchronous clock in the above sampling operation, sampling is usually performed twice per chip. Consequently, supposing a chip width Tc of the PN signal, a sampling interval will be given as Tc/2. The correlators 15A and 15B correlate sampled signals which were sampled during a period equivalent to one cycle of the PN signal with the reference PN signals. Since one cycle of the PN signal is N, the number of each of the sampled signals 14a and 14b having been subjected to sampling during a period equivalent to one cycle of the PN signal is 2N. Sampling per twice chip results in a sampled signal having the same PN signal adjacent to the sampled signals 14a and 14b, and the correlators 15A and 15B generate correlation signals as expressed below, making use of 2N sampled signals having been inputted thereto.

$$\sum_{i=1}^{2N} \gamma_i C[(i+1)/2] \quad (3)$$

where $\gamma_i$ (i=1, ..., 2N) is 2N sampled signals to be inputted, $c_j$ is the reference PN signal having a value of either −1 or +1, and [n] is the maximum integer which does not exceed n. The correlators can be said to be circuits which generate an auto correlation of the PN signal.

Next, referring to FIG. 2, the relationship between the base band signals 13a and 13b subjected to sampling performed twice per chip and a sampling timing will be described. Presume that a time t=iTC (i=1, 2, ...) is the center of each chip waveform, that times when two sampling timings of each chip respectively offset +Δt from two timings (iTc−Tc/4) and (iTc+Tc/4) symmetrical with the center of the each chip waveform are defined as $t_1(=iTc-Tc/4+\Delta t)$ and $t_2(=iTc+Tc/4+\Delta t)$, and that the sampling circuits 14A and 14B sample the analog quantity of input signals as they are, the sampled signals 14a and 14b sampled at the timing $t_2$ are respectively expressed as follows.

$$d(t_2)c(t_2)h(Tc/4+\Delta t)\cos\theta \quad (4)$$

$$d(t_2)c(t_2)h(Tc/4+\Delta t)\sin\theta \quad (5)$$

where h($t_0$) represents a unit pulse waveform of a chip which is characterized by the characteristic of the low pass filters 13A and 13B, and h($_0$) corresponds to the center of the chip waveform.

If c($t_2$) is rewritten into $c_i$ (having a value of −1 or +1), the sampled signals 14a and 14b sampled at the timing of $t_2$ can be expressed as $$d(t_2)c_i h(Tc/4+\Delta t)\cos\theta \quad (6)$$

$$d(t_2)c_i h(Tc/4+\Delta t)\sin\theta \quad (7)$$

The relationship between the correlation signals 15a and 15b and the sampling timing will now be explained with reference to FIG. 3.

At a sampling timing ts ($=kNTc+Tc/4+\Delta t$), (k=1, 2, ...), the correlators 15A and 15B correlate 2N sampled signals 14a and 14b from a timing tu ($=\{(k-1)N+1\}Tc-Tc/4+\Delta t$) to a timing ts ($=kNTc+Tc/4+\Delta t$).

Each of 2N number of sampled signals 14a and 14b contains two PN signal components from $c_1$ to $c_N$. Since each sampled signal contains $c_1, c_1, c_2, c_2, \ldots, c_N, c_N$, the PN signal component comprised in the received signal 1 at the sampling time ts is matched with the reference PN signal.

Accordingly, the correlation signals 15a and 15b will be signals from which the PN signal components have been respectively eliminated, as expressed by $c_i \times c_i = 1$.

$$\left[\sum_{i=1}^{N} d((k-1)NTc + iTc - (Tc/4) + \Delta t) \times h(-Tc/4 + \Delta t) + \right. \quad (8)$$

$$\left. \sum_{i=1}^{N} d((k-1)NTc + iTc + (Tc/4) + \Delta t) \times h(+Tc/4 + \Delta t) \right]\cos\theta$$

$$\left[\sum_{i=1}^{N} d((k-1)NTc + iTc - (Tc/4) + \Delta t) \times h(-Tc/4 + \Delta t) + \right. \quad (9)$$

$$\left. \sum_{i=1}^{N} d((k-1)NTc + iTc + (Tc/4) + \Delta t) \times h(+Tc/4 + \Delta t) \right]\sin\theta$$

If one information data bit is spread by the PN signal, the information data does not change within one cycle of the PN signal. Hence, if d ((k−1)NTc+iTc−Tc/4+Δt) and d((k−1)NTc+iTc+Tc/4+66 t) are represented as $d_k$ (having a value of −1 or +1), the correlation signals 15a and 15b at the sampling timing ts when the PN signal components included in the received signal 1 and the reference PN signal are completely matched with each other can be expressed as $$Nd_k\{h(-Tc/4+\Delta t)+h(+Tc/4+\Delta t)\}\cos\theta \quad (10)$$

$$Nd_k\{h(-Tc/4+\Delta t)+h(+Tc/4+\Delta t)\}\sin\theta \quad (11)$$

Contrary to this, the correlation signals 15a and 15b at a timing when the PN signal components included in the received signal 1 are out of phase with the reference PN signal becomes −1 when the PN signal is M-sequence. Hence, respectively, respective these correlation signals can be represented as $$-d_k\{h(-Tc/4+\Delta t)+h(+Tc/4+\Delta t)\}\cos\theta \quad (12)$$

$$-d_k\{h(-Tc/4+\Delta t)+h(+Tc/4+\Delta t)\}\sin\theta \quad (13)$$

Since $d_k \times d_k = 1$, the information data component $d_k$ is eliminated from the correlation signals 15a and 15b by squaring the signals by means of the square generators 16A and 16B. Thereafter, the correlation pulse signal 24 is produced by adding the correlation signals 15a and 15b at the adder 23.

As a result of this, the correlation pulse signal 24 does not include any information data components, and is represented by the following equation at the timing ts when the PN signal components included in the received signal 1 is completely matched with the reference PN signal.

$$N^2\{h(-Tc/4+\Delta t)+h(+Tc/4+\Delta t)\}^2 \qquad (14)$$

Contrary, the correlation pulse signal 24 is represented by the following equation at a timing when the PN signal components included in the received signal 1 is out of phase with the reference PN signal.

$$\{h(-Tc/4+\Delta t)+h(+Tc/4+\Delta t)\}^2 \qquad (15)$$

Since a PN signal having a large cycle of N is commonly used in spread spectrum communications, there consequently arises a large difference between the amplitude of the correlation pulse signal 24 produced at the time when the received PN signal is in phase with the reference PN signal and the amplitude of the correlation pulse signal 24 produced at the time when these signals are out of phase with each other.

The decision device 25 decides a generation timing of the acquired signal 3 making use of the above mentioned characteristics, and outputs the acquired signal 3, thereby completing the initial acquisition operation.

Subsequently, the acquired signal 3 thus generated by the initial acquisition circuit is transmitted to the tracking circuit 4 shown in FIG. 16, and thereafter tracking of the PN signal included in the received signal 1 is effected. A conventional tracking circuit 4 will be described hereinbelow.

FIG. 18 shows the structure of the conventional tracking circuit used in the spread spectrum demodulator shown in the aforementioned documents written by M. K. Simon.

In FIG. 18, reference numerals 26A and 26B designate multipliers for multiplying the received signal 1 by an early PN reference signal 39 and a late PN reference signal 40 respectively, both being generated by a PN signal generator 38; 27A and 27B, band-pass filters (BPF) having a center frequency equivalent to the carrier frequency of the received signal 1; 28A and 28B, square generators; 34, a subtracter for producing a difference of levels between the output of the square generators 28A and 28B; 35 and 35a, error signals; 36, a loop filter; 37, a voltage controlled oscillator for generating a reproduced clock 37a by varying an output frequency by use of a voltage of the error signal 35a; 38, a PN signal generator for generating the early and the late PN reference signals 39, 40 from the reproduced clock 37a; and 41, a delay element for causing the Tc/2 period delay of the early PN reference signal 39.

A description will be given of the tracking circuit shown in FIG. 18.

Upon receipt of the acquired signal 3, the PN signal generator 38 starts outputting both the early PN reference signal 39 and the late PN reference signal 40. The early PN reference signal 39 is advanced in phase by Tc/2 with respect to the punctual PN reference signal 5, whilst the late PN reference signal 40 is delayed in phase by a Tc/2 with respect to the punctual PN reference signal 5.

Assume that the punctual PN reference signal 5 is delayed in phase by a time, $\tau$, with respect to the phase of a PN signal c(t) included in the received signal 1. The punctual PN reference signal 5 designated by $S_R(t)$, the early PN reference signal 39 designated by $S_E(t)$, and the late PN reference signal 40 by $S_L(t)$ are characterized by the following equations.

$$S_R(t)=c(t-\tau) \qquad (16)$$

$$S_E(t)=S_R(t+Tc/2)=c(t-\tau+Tc/2) \qquad (17)$$

$$S_L(t)=S_R(t-Tc/2)=c(t-\tau-Tc/2) \qquad (18)$$

The received signal 1 (=d (t) c (t) $\cos\omega_0 t$) is divided into two, and one half is multiplied by the early PN reference signal $S_E(t)$ by means of the mixer 26A, and the thus obtained signal is inputted in the band-pass filter 27A. The band-pass filter 27A passes a signal whose spectrum band width is within that of the information data d(t). This filter is inserted in order to eliminate unwanted noise components received together with the received signal 1. Instantaneous value components c (t) c (t−$\tau$+Tc/2) included in the signal outputted from the band-pass filter 27A are eliminated by the characteristic of a loop which constitutes the tracking circuit that suppresses a high frequency component, leaving an average of a result from the multiplication of the PN signal contained in the signal outputted from the band pass filter 27A. This average value results in a signal expressed as below.

$$d(t)\overline{c(t)c(t-\tau+Tc/2}\cos\omega_0 t \qquad (19)$$

where $\overline{c(t)c(t-\tau+Tc/2)}$ represents a time average of c (t) c (t−$\tau$+Tc/2 component.

The time average of the c (t) c (t−$\tau$+Tc/2) represents the autocorrelation function of the PN signal, and shows a maximum value rate Tc/2 and a minimum value −1 at $|\tau-Tc/2| \geq Tc$.

Assume that the autocorrelation function is $R_E(\tau)$, then the $R_E(\tau)$ is expressed as $$R_E(\tau) = \overline{c(t)c(t-\tau+Tc/2)} \qquad (20)$$

$$\begin{cases} -\{(N+1)/Tc\} \, |\tau - Tc/2| + N \\ \qquad \text{(in the case of } |\tau - Tc/2| \leq Tc) \\ -1 \quad \text{(in the case of } |\tau - Tc/2| > Tc) \end{cases}$$

Squaring the output signal from the band-pass filter 27A by means of the square generator 28A results in elimination of the information data component d(t). Despite the fact that squaring the carrier frequency component $w_0$ causes generation of a DC component and a $2w_0$ component, the characteristic of the loop which constitutes the tracking circuit for suppressing the high frequency component allows the elimination of the $2w_0$ components, eventually the DC component simply appearing at the output of the band-pass filter 27A.

As a result of this, the signal 29a outputted from the square loop 28A becomes $\{R_E(\tau)\}^2$. The other half of the divided received signal 1 is multiplied by the late PN reference signal $S_L$ (t) by means of the mixer 26B, and then transmitted to the band-pass filter 27B. The output signal of the bandpass filter 27B is then expressed as $$d(t)\overline{c(t)c(t-\tau Tc/2)}\cos\omega_0 t (k=1, 2, \ldots) \qquad (21)$$

Suppose the autocorrelation function of the PN signal which is included in the above signal is $R_L(\tau)$, the $R_L(\tau)$ will be represented as $$R_L(\tau) = \overline{c(t)c(t - \tau - Tc/2)} \qquad (22)$$

$$\begin{cases} -\{(N + 1)/Tc\}\, |\tau + Tc/2| + N \\ \quad \text{(in the case of } |\tau + Tc/2| \leq Tc) \\ -1 \quad \text{(in the case of } |\tau + Tc/2| > Tc) \end{cases}$$

Squaring the output signal from the band-pass filter 27B by means of the square loop 28B results in the signal 29b represented as $\{R_L(\tau)\}2$.

The subtracter 34 generates the error signal 35 from the signals 29a and 29b, and this error signal is then subjected to elimination of unwanted noise by the loop filter 36, producing the error signal 35a. The error signals 35 and 35a are expressed by the following equation.

$$D(\tau) = \{R_E(\tau)\}^2 - \{R_L(\tau)\}^2 \qquad (23)$$

FIG. 19 shows the amplitude characteristic of the error signals 35 and 35a. Thus, the error signals are configured in S shape symmetry with respect to the origin of coordinates, and have a characteristic to produce $D(\tau) > 0$ with $\tau > 0$ and $D(\tau) < 0$ with $\tau < 0$. Such characteristics are hereinafter referred to as a time discrimination characteristic.

The voltage controlled oscillator 37 produces an output of the reproduced clock 37a having a frequency corresponding to the amplitude of the error signals. In response to the output from the voltage controlled oscillator 37, the PN signal generator 38 outputs both the early and late PN reference signal 39 and 40.

This operation is effected in such a manner as to maintain the value $\tau$ of 0, and hence the early PN reference signals 39 is in synchronism with the PN signal included in the received signal 1 which is phase advanced by Tc/2, whereas the late PN reference signal 40 is in synchronism in phase delayed by Tc/2.

The early PN reference signal 39 is delayed by a period of Tc/2 by means of the delay element 41 and outputted as the punctual PN reference signal 5 completely in phase with ($\tau=0$) the PN signal components included in the received signal 1.

As mentioned above, the PN signal components included in the received signal 1 shown in FIG. 16 are eliminated (despread) using the punctual PN reference signal 5 which was generated by the tracking circuit, and subsequently the information data is demodulated by means of the conventional PSK demodulator 9.

In the conventional spread spectrum demodulator apparatus having the foregoing structure, the initial acquisition circuit performs initial acquisition using a received signal from which PN signal components have been eliminated, and the tracking circuit exercises tracking using the received signal from which the PN signal components have been eliminated in the same manner.

Thus, in the conventional spread spectrum demodulator, the operation of eliminating a PN signal component included in the received signal which is performed by the initial acquisition circuit and the tracking circuit independently of each other has resulted in a bulky apparatus with a complex structure.

In the case where the conventional spread spectrum demodulator finds application in the fields of mobile satellite communications such as mobile telephones and the like, a plurality of signals (hereinafter referred to as a multipath waveform) having different propagation delays are received at the same time, and the level of each received signal varies with time. If tracking is effected for only one of these signals, a sharp drop in the level of the received signal of interest will occur, even down to 0, when the received signal that is the target of the tracking is interfered with obstacles such as buildings. Eventually, a lack of error signals which are necessary in tracking, namely a drop of the amplitude of the error signals to zero, causes asynchronization (what is called locking-off) due to the improper tracking. The locking-off makes demodulation of information data impossible.

SUMMARY OF THE INVENTION

A spread spectrum demodulator according to this invention aims at resolving the aforementioned drawbacks in the conventional art, and an object of the present invention is to provide a spread spectrum demodulator simple in structure and compact in size compared with the conventional demodulator by generating error signals having the time discrimination characteristic from correlation pulse signals which are outputted from a correlation pulse signal generation means of an initial acquisition circuit and performing tracking.

Another object of this invention is to provide a spread spectrum demodulator capable of maintaining tracking without causing locking-off of tracking even when there a sharp drop occurs in the signal level of a multipath waveform when applied to a transmission path where multipath waveforms are present.

To this aim, according to one aspect of this invention, there is provided a spread spectrum demodulator for use with a phase-shift-keying modulated spread spectrum signal for demodulating information data using a correlation pulse signal derived from a received signal whose spectrum has been spread by a pseudonoise signal, the spread spectrum demodulator comprising means for generating an error signal having a time discrimination characteristic from the correlation pulse signal and thereby performing tracking.

To achieve this purpose, according to another aspect of this invention, there is provided a spread spectrum demodulator for use with a phase-shift-keying modulated spread spectrum signal for demodulating information data from a received signal whose spectrum has been spread by the pseudonoise signal, the spread spectrum demodulator comprising:

base band signal generator means for producing an output of a base band signal by waveform-shaping the received signal;

sampled signal generator means for producing an output of a sampled signal by sampling the base band signal;

correlation signal generator means for producing an output of a correlation signal when a pseudonoise signal component contained in the base band signals is in phase with a predetermined reference pseudonoise signal as judged by phase comparison;

error signal generator means for producing from the correlation pulse signals an output of an error signal whose level varies accordance with to a phase difference between the pseudonoise signal component contained in the sampled signal and the reference pseudonoise signal;

clock generator means for producing from the error signal an output of a chip clock in synchronism with the received signal; and information data extracting means for obtaining demodulated data by extraction of information data from the correlation signal.

In the spread spectrum demodulator for use with a phase-shift-keying modulated spread spectrum signal having the structure set forth in the above, the error signal generator means detects from the correlation pulse signal produced by the correlation pulse signal generator means a phase difference between pseudonoise signal components included in the received signal and the reference pseudonoise signal, and generates an error signal having a time discrimination characteristic which varies in accordance with the phase difference, thereby reducing the operation of eliminating the pseudonoise signal component from the function of the tracking circuit.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF THE INVENTION

First Embodiment

Figure 1:
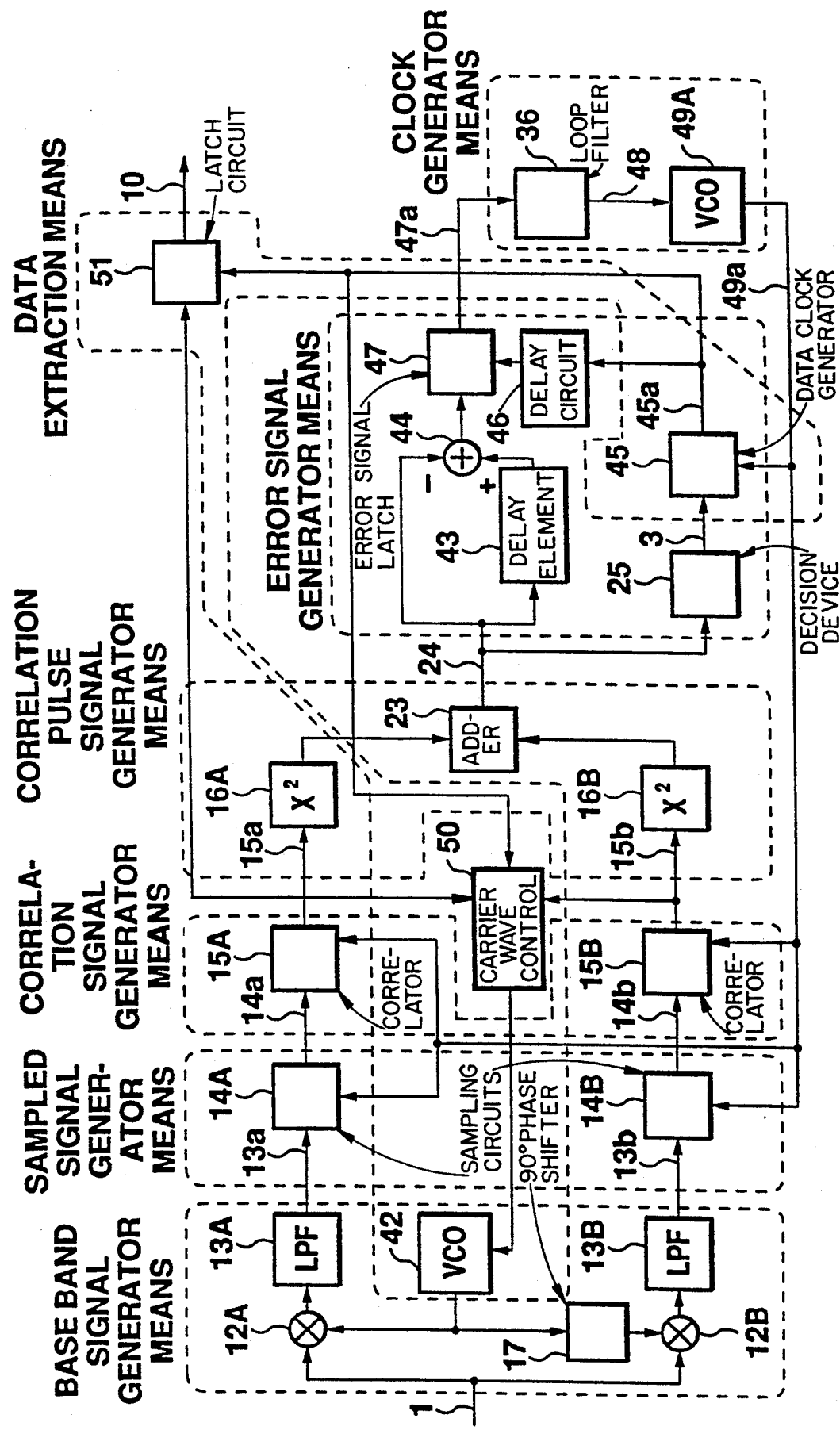
FIG. 1 is a schematic representation of the configuration of a spread spectrum demodulator according to a first embodiment of this invention.
Figure 2:
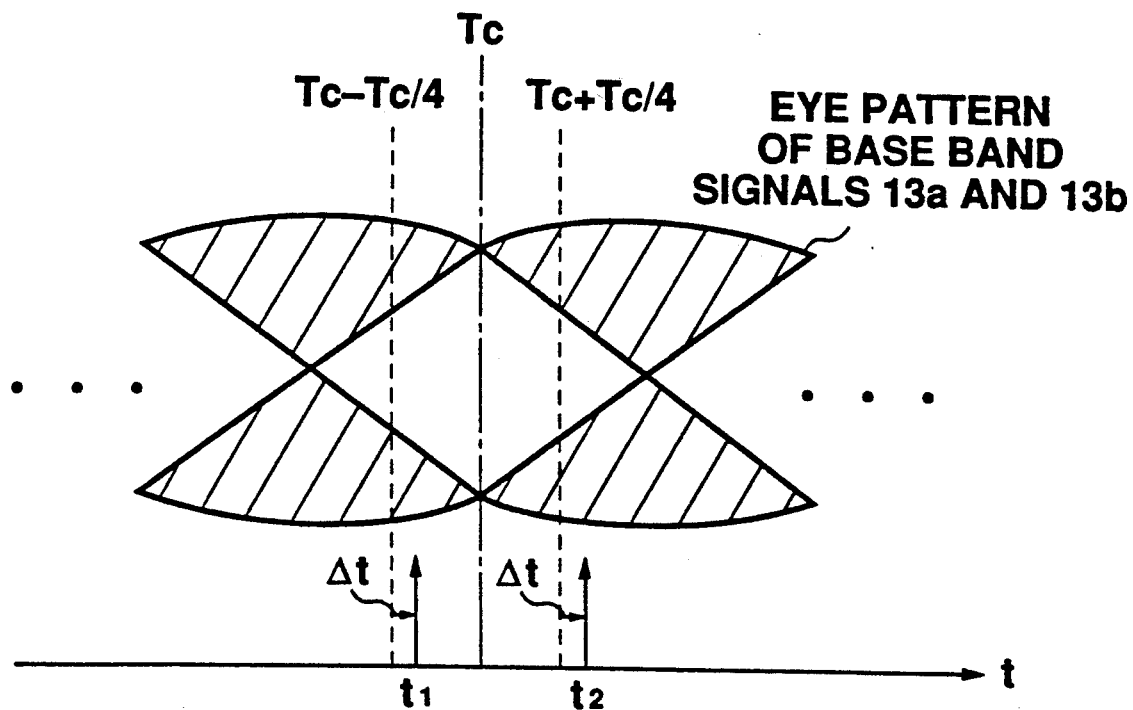
FIG. 2 is a diagrammatic representation illustrating a sampling timing.

FIG. 1 shows the configuration of the spread spectrum demodulator according to a first embodiment of the present invention.

Figure 16:
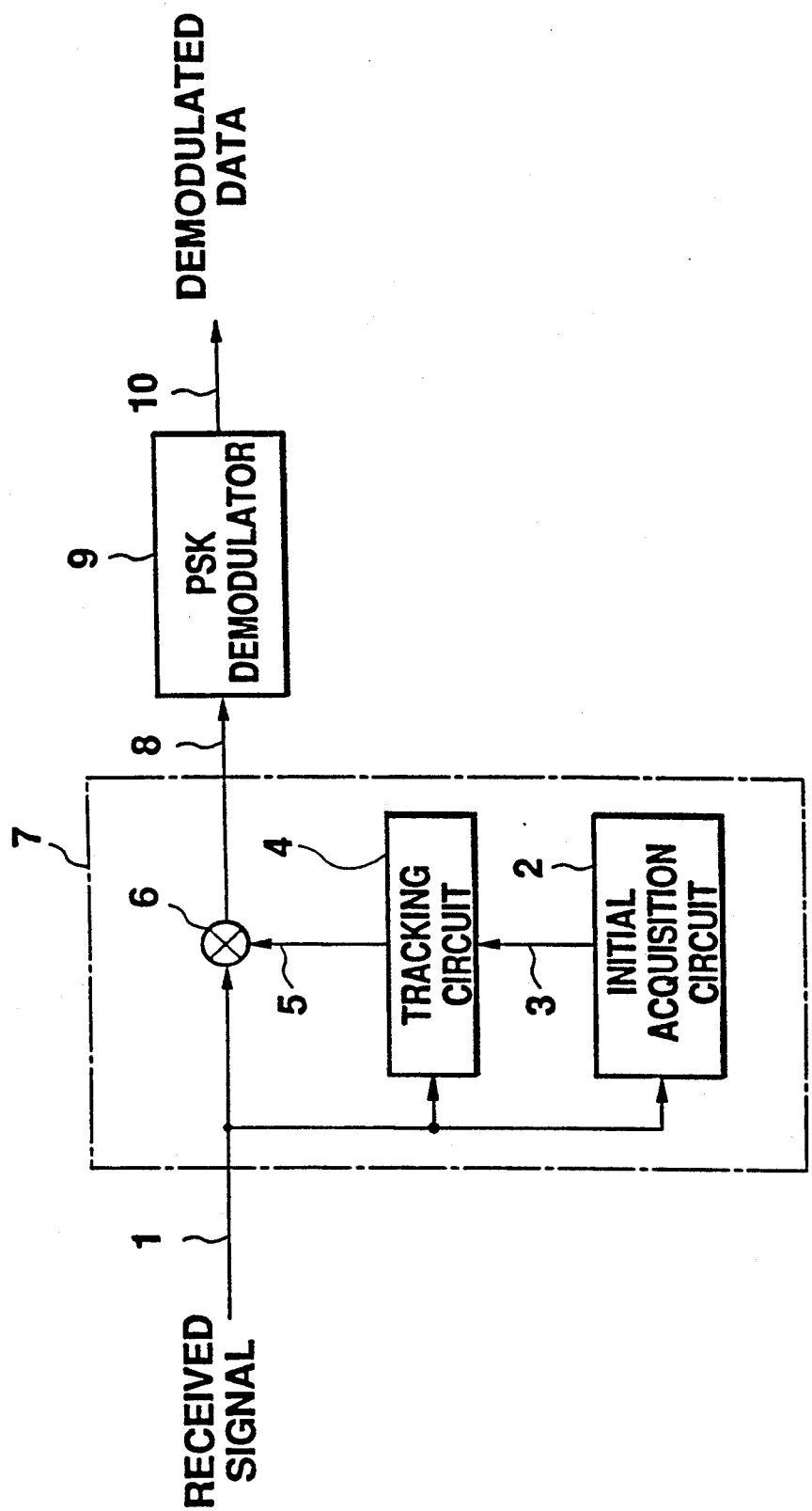
FIG. 16 is a block diagram of a conventional spread spectrum demodulator.
Figure 17:
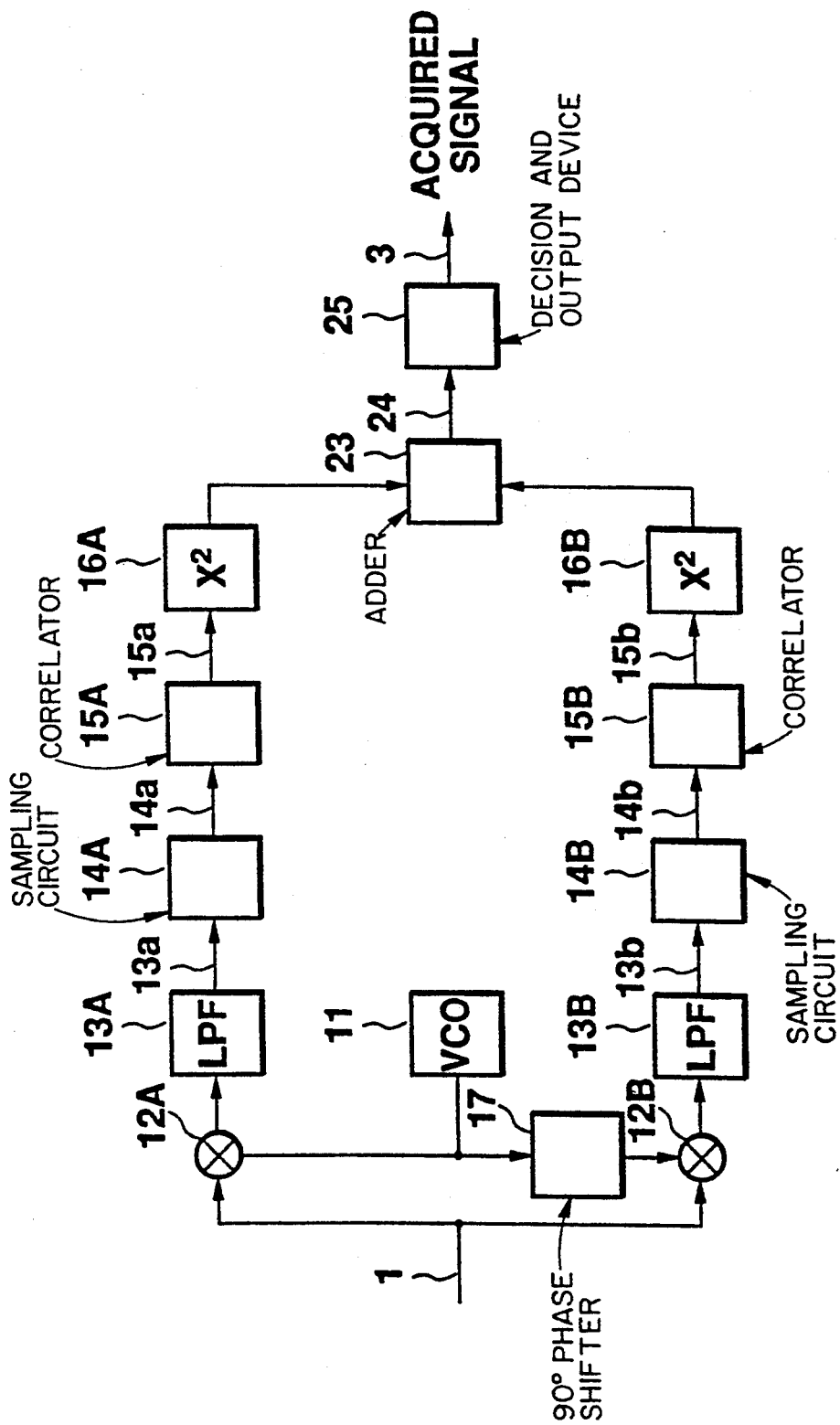
FIG. 17 is a schematic representation of an initial acquisition circuit of the conventional spread spectrum demodulator.
Figure 18:
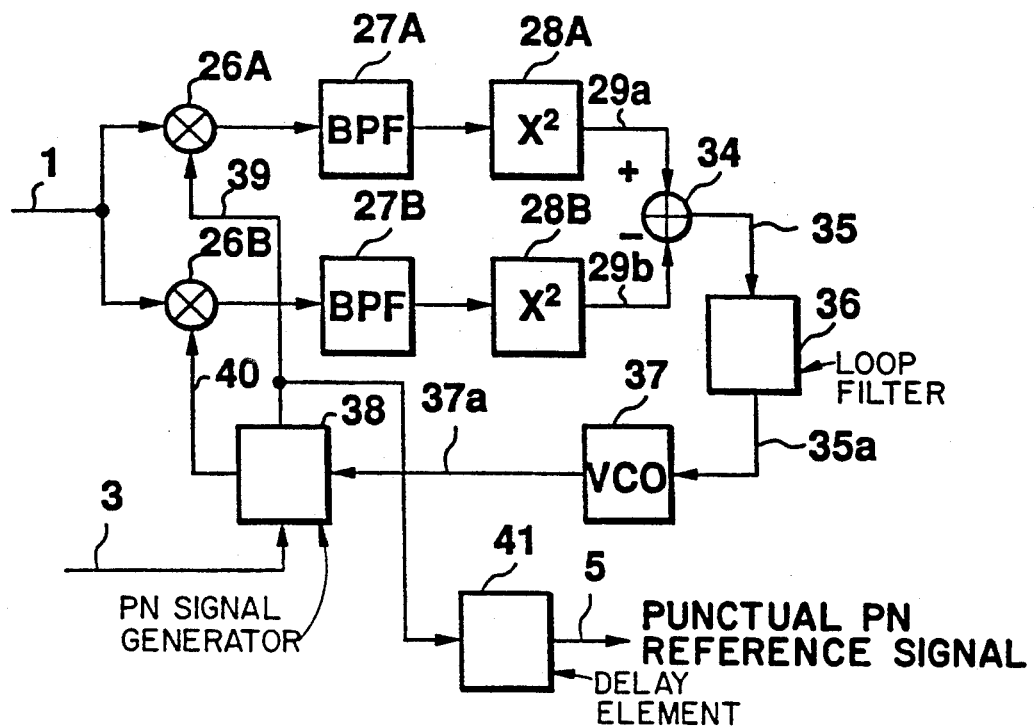
FIG. 18 is a schematic representation of a tracking circuit of the conventional spread spectrum demodulator.
Figure 19:
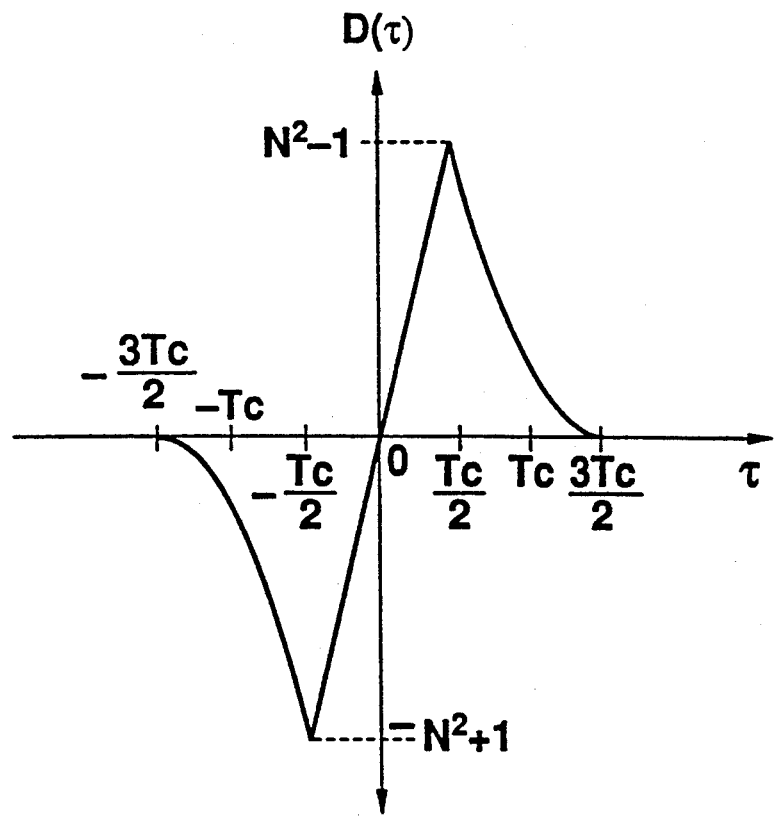
FIG. 19 is a graphic representation of the amplitude characteristic of an error signal of the tracking circuit shown in FIG. 18.

The circuit elements which constitute each of the means in the present invention are shown connected by a dotted line in FIG. 1. In FIG. 1, the same reference numerals are provided to indicate corresponding features of FIGS. 16 to 18, and an explanation thereof is omitted for clarity.

Reference numeral 42 designates a voltage controlled oscillator for outputting a carrier wave by variation of an oscillation frequency with a control voltage from a carrier wave control circuit 50, as will be described later; 43, a delay circuit for delaying the correlation pulse signal 24 by a period Tc; 44, a subtracter; 45, a data clock generator circuit for generating a data clock 45a of the information data rate in response to the acquired signal 3; 46, a delay circuit for delaying the data clock in synchronism with the information data by a period Tc/2; 47, an error signal latch circuit for latching an output signal from the subtracter 44; and 47a and 48, error signals. Reference numeral 49A designates a voltage controlled oscillator for generating, in response to the error signal 48 a chip clock 49a for sampling twice per chip; 49a, a chip clock having a frequency of twice the chip rate; 50, a carrier wave control circuit for generating, from the correlation signals 15a and 15b, a control voltage in accordance with a phase difference of the carrier waves; and 51, a latch circuit for producing an output of demodulated data by latching the correlation signal 15a using the data clock 45a in synchronism with the information data.

With reference to FIG. 1, the operation of the spread spectrum demodulator according to a first embodiment of this invention will be described hereunder.

Suppose a phase difference between the carrier wave of the received signal 1 and the carrier wave outputted from the voltage controlled carrier wave generator 42 is $\theta$, the correlation pulse signal 24 has a peak at a sampling time ts ($=kNTc+Tc/4 +\Delta t$) wherein the PN signal included in the received signal is in phase with the reference PN signal, and the peak is expressed as $$Rs = N^2 \{h(-Tc/4+\Delta t) + h(+Tc/4+\Delta t)\}^2 \tag{30}$$

Assume the correlation pulse signal 24 at a point preceding the time ts by one sampling period, that is at a sampling time $t_E$ ($=kNTc-Tc/4 +\Delta t$) prior to the time ts by a period of Tc/2, is $R_E(\Delta t)$, and that the correlation pulse signal 24 at a point following the time ts, that is a sampling time $t_L$ ($=kNTc+3Tc/4+\Delta t$) subsequent to the time ts by a period of Tc/2, is $R_L(\Delta t)$, then the $R_E(\Delta t)$ and $R_L(\Delta t)$ are expressed by the following equations, respectively.

$$R_E(\Delta t) = N^2\{h(-3T_c/4 + \Delta t) + h(-T_c/4 + \Delta t)\}^2 \quad (31)$$

$$R_L(\Delta t) = N^2\{h(+T_c/4 + \Delta t)\}^2 \quad (32)$$

As can be seen, there arise two sub peaks, smaller than the main peak Rs of the correlation pulse signal, in the correlation pulse signal 24 at the times of $t_E$ and $t_L$ before and after the sampling time ts when the PN signal included in the received signal and the reference PN signal are in phase with each other.

According to this invention, there is produced, from two signals $R_E(\Delta t)$ and $R_L(\Delta t)$ of the foregoing correlation pulse signal 24, an error signal having a time discrimination characteristic for tracking use.

After the correlation pulse signal 24 has been divided into two, one half is delayed by a period of Tc by means of the delay element 43. As a result of this, the input signal of the subtracter 44 at the sampling time $t_L$ ($=kNTc + 3Tc/4 + \Delta t$) is $R_L(\Delta t)$, and the output signal from the delay element 43 is $R_E(\Delta t)$. At this time, assuming that the output signal from the subtracter 44 is R ($\Delta t$), this R ($\Delta t$) can be expressed by the following equation and is provided with an appropriate time discrimination characteristic.

$$(\Delta t) = R_E(\Delta t) - R_L(\Delta t) \quad (33)$$

The time discrimination characteristic of the R ($\Delta t$) will now be described.

Consider that the low-pass filters 13A and 13B are provided with a cosine roll-off characteristic, a unit pulse waveform for a chip h ($t_0$) is represented as follows with a roll-off factor of $\alpha$.

$$h(t_0) = [\{\sin(\pi t_0/T_c)\}/(\pi t_0/T_c)] \times \quad (34)$$
$$[\{\cos(\pi\alpha t_0/T_c)\}/\{1 - (2\alpha t_0/T_c)^2\}]$$

Figure 4:
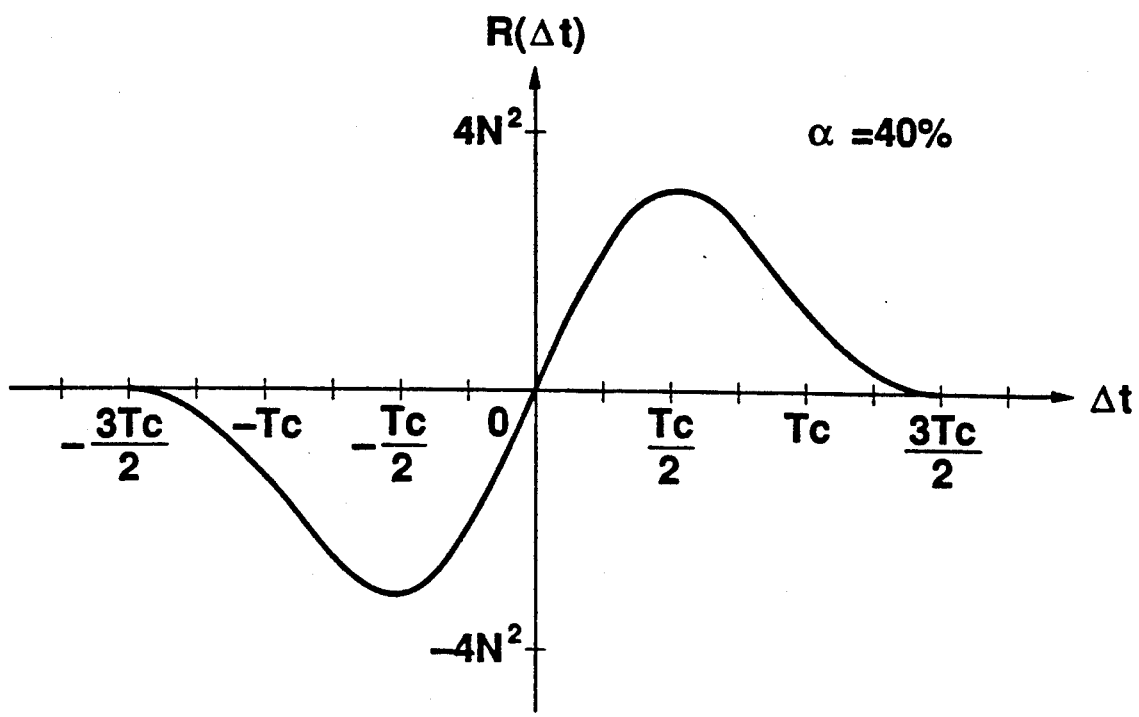
FIG. 4 is a graphical representation of the amplitude of the error signal for tracking use shown in FIG. 1.

FIG. 4 shows the amplitude characteristic of the output signal R ($\Delta t$) from the subtracter 44 when $\alpha = 0.4$ (a roll-off factor of 40%), as one example.

As mentioned above, it is possible to generate, from the correlation pulse signal 24 of the initial acquisition circuit, the error signal having the appropriate time discrimination characteristic.

Since the time discrimination characteristic is obtained every sampling time $t_L$ ($=kNTc + 3Tc/4 + \Delta t$) k=1, 2, ... ), i.e., every one cycle of the PN signal, the time discrimination characteristic can be obtained by the data clock 45a in synchronism with one cycle of the PN signal.

The data clock 45a is produced from the acquired signal 3 by the data clock generator circuit 45. The data clock generator circuit 45 produces the data clock 45a having a rise at the time of ts by the frequency division of the chip clock 49a in response to the acquired signal 3 generated at the sampling timing ts ($=kNTc + Tc/4 + \Delta t$) when the PN signal included in the received signal and the reference PN signal are in phase with each other.

After having been delayed by means of the delay circuit 46 with the delay time of Tc/2, the data clock 45a becomes a delayed data clock having a rise at the time of tL ($=kNTc + 3Tc/4 + \Delta t$).

The error signal latch circuit 47 latches an input signal at the rise time of $t_L$ of the data clock. With such a latch circuit, the error signal R ($\Delta t$) is latched at the time of $t_L$, and the error signal 47a having the proper time discrimination characteristic is outputted from the error signal latch circuit 47 every one cycle of the PN signal.

After having been subjected to noise elimination by means of the loop filter 36, the thus obtained error signal 47a is output as the error signal 48, and is transmitted to the voltage controlled oscillator 49A.

The voltage controlled oscillator 49A generates the chip clock 49a having a frequency of twice the chip rate corresponding to the voltage of the error signal 48, and this chip clock 49a is then transmitted to both the sampling circuits 14A and 14B and the correlators 15A and 15B to activate them.

The tracking operation set forth in the above is effected so as to render the error signals 47a and 48 zero, and hence the tracking point is $\Delta t = 0$. Actually, two points where two sampling times for each chip are symmetrical with each other relative to the center of the chip waveform are designated as tracking points.

A description will now be given of the demodulation of information data.

Figure 3:
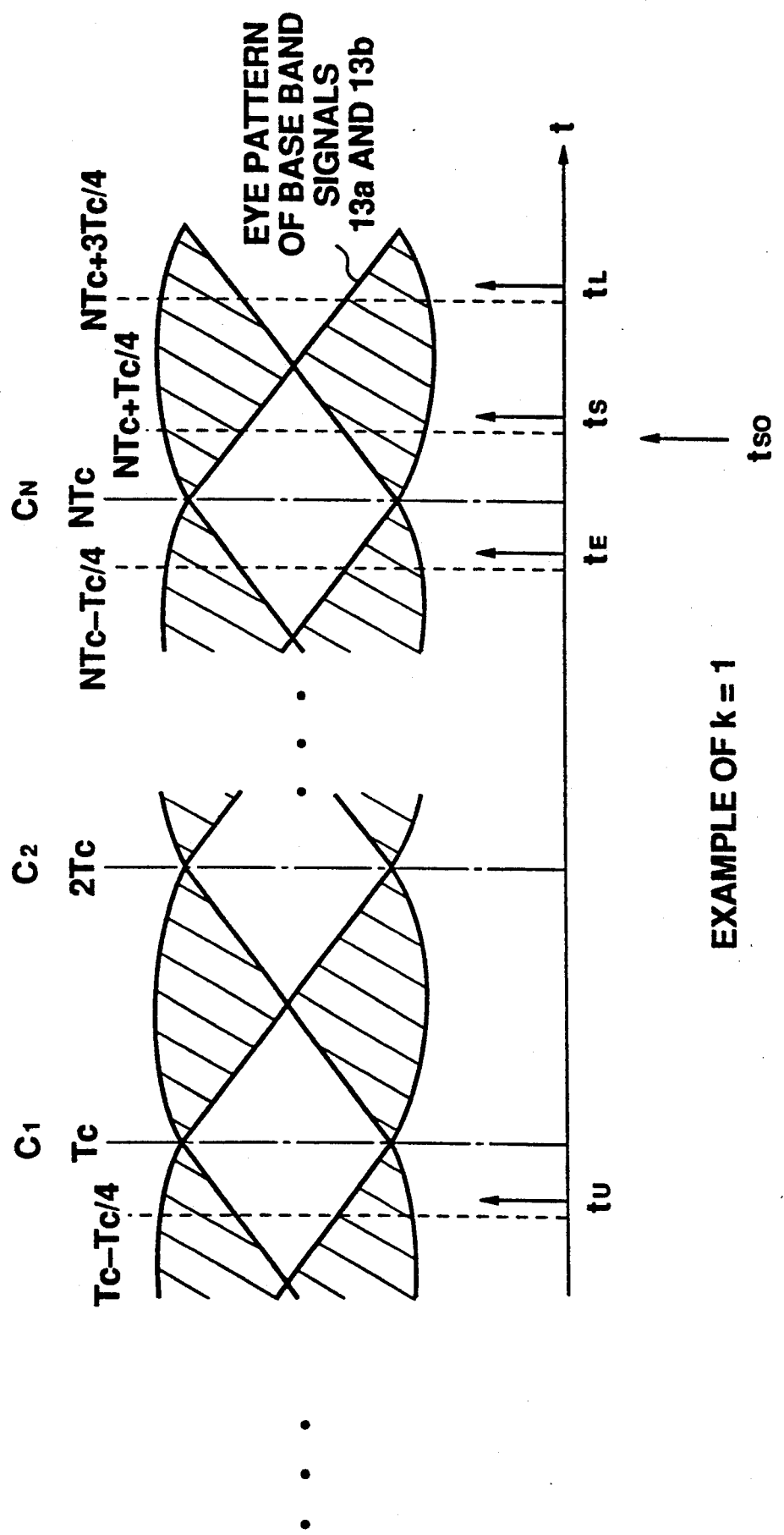
FIG. 3 is a diagrammatic representation illustrating a sampling timing.

In a synchronized state, sampling is effected using the chip clock 49a synchronized at two points which are symmetrical with respect to the center of the chip waveform at the sampling circuits 14A and 14B. Hence, the two correlation signals 15a and 15b can be expressed as follows at the sampling time $t_{S0}$ ($=kNTc + Tc/4$), (k=1, 2, ... ) when the PN signals are perfectly matched with each other as shown in FIG. 3.

$$Nd_k\{h(-Tc/4) + h(+Tc/4)\}\cos\theta \quad (35)$$

$$Nd_k\{h(-Tc/4) + h(+Tc/4)\}\sin\theta \quad (36)$$

If the phase difference 8 between the carrier wave included in the received signal 1 and the carrier wave outputted from the voltage controlled carrier wave generator 42 is controlled to be zero or $\pi$ (rad), the information data component $d_k$ can be extracted from the correlation signal 15a.

The carrier wave control circuit 50 generates a control voltage in such a manner as to render the phase of the output carrier wave of the voltage controlled carrier wave generator to be $\theta = 0$ or $\pi$ (rad) by acquisition of the correlation signals 15a and 15b in response to the data clock 45a having a rising edge at the sampling time $t_{S0}$ ($=kNTc + Tc/4$), (k=1, 2, ... ).

This operation is carried out by producing a signal expressed by the following equation which includes information about the phase difference 8 of the carrier wave with multiplication of the correlation signals 15a and 15b.

$$N_2\{h(-Tc/4) - h(-Tc/4)\}^2 \sin 2\theta \quad (37)$$

Provided that the voltage controlled carrier wave generator 42 is activated by use of the above signal as the control signal, the phase of the carrier wave outputted from the oscillator is synchronized with that of the received signal at zero or $\pi$ (rad). The demodulated data 10 is then produced by latching the correlation signal 15a at the timing of $t_{S0}$ ($=kNTc + Tc/4$), (k=1, 2, ... ) by means of the latch circuit 51 in response to the data clock 45a.

The aforementioned first embodiment has been described with reference to the case where the low-pass filter for waveform shaping use has a cosine roll-off characteristic with a roll-off factor of 40%. Needless to say, the roll-off factor is not limited to this specific value, and hence the error signal having a similar time discrimination characteristic can be produced at a roll-off factor of 50%, for example.

In addition, the low-pass filter need not be limited to one with a cosine roll-off characteristic, but may be replaced with, for example, a low-pass filter having the Butterworth characteristic.

In the first embodiment, the description has only been given of waveform shaping by virtue of the characteristic of the filter for use in the demodulator at the receiving end. However, the error signal having the similar time discrimination characteristic can be produced by waveform shaping by utilising the general characteristics of both a filter for use in the transmitting end and a filter for use in the demodulator. Use of the filter in the transmitter allows the band width of transmitting signals to be reduced. Replacing the sampling circuit that samples the analog quantity of input signals described in the first embodiment with an analog-to-digital converter allows circuits at the stage following the sampling circuit to be constructed with digital circuits.

Second Embodiment

Figure 5A:
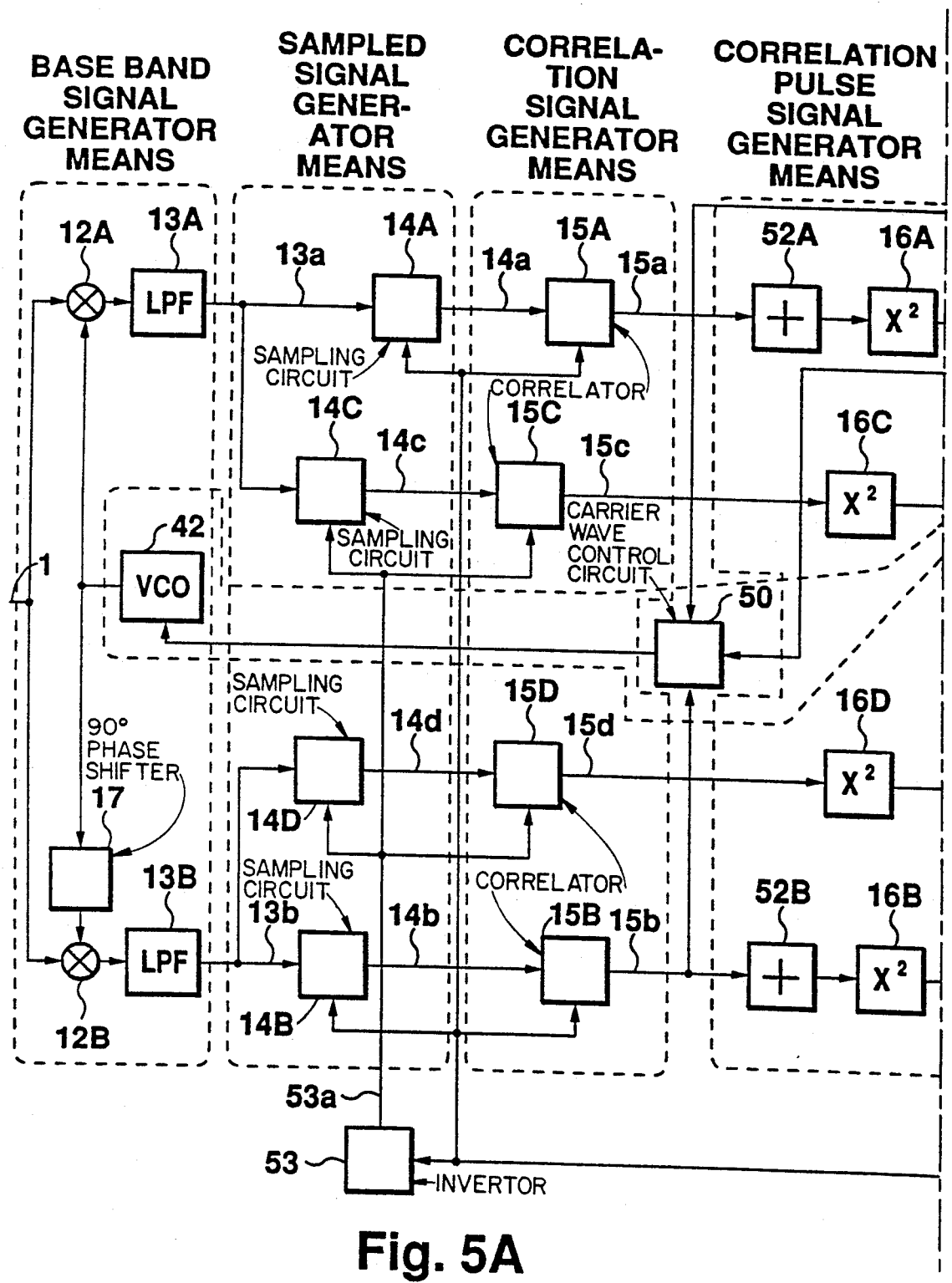
FIGS. 5A and 5B together are a schematic representation of the configuration of a spread spectrum demodulator according to a second embodiment of this invention.
Figure 5B:
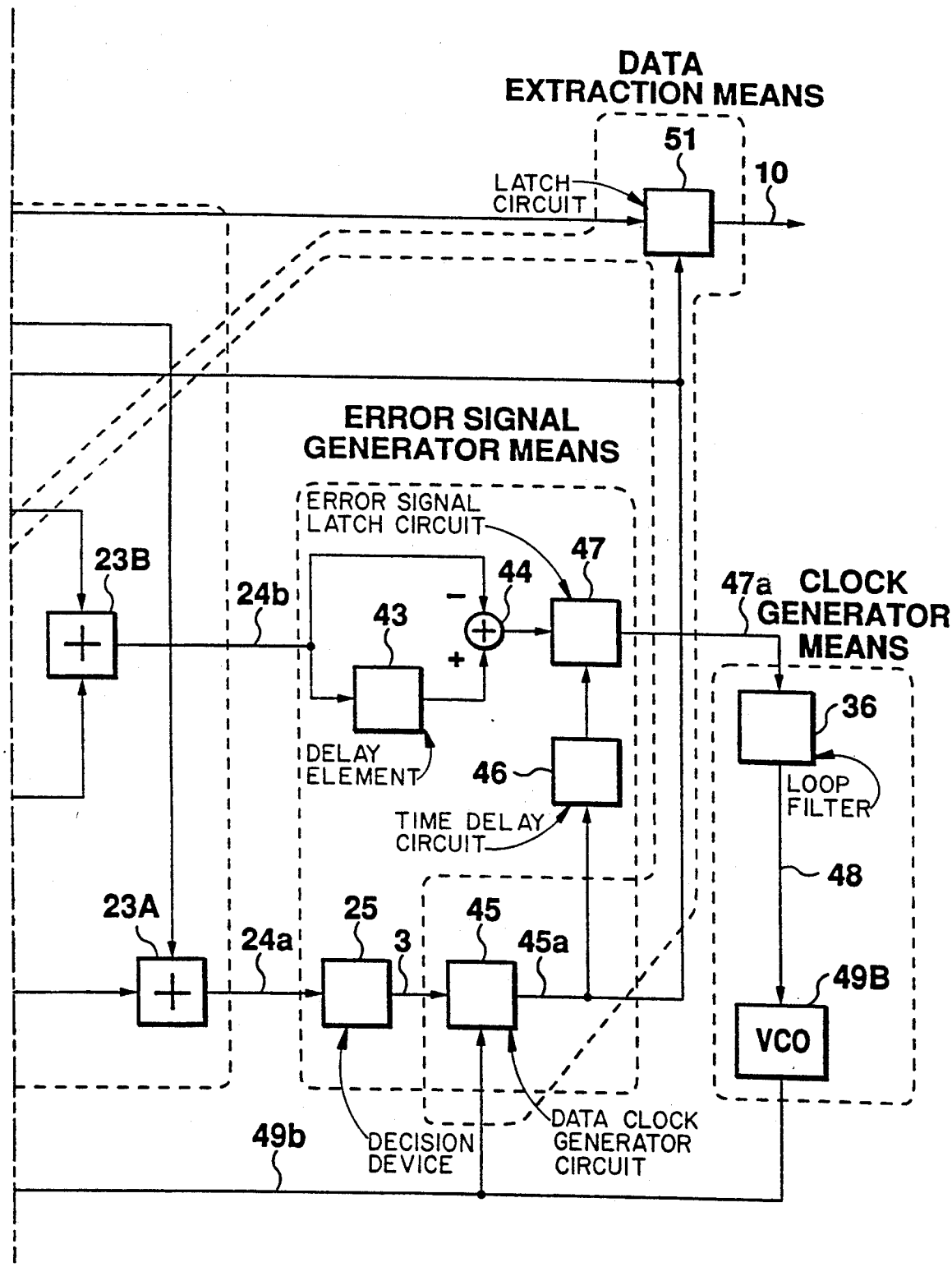

FIGS. 5A and 5B are a schematic representation of a spread spectrum demodulator according to a second embodiment of this invention.

A chief difference between the structure of the first embodiment and the second embidiment is that sampling circuits, and correlators associated with the sampling circuits, are arranged in parallel with each other in the sampling signal generator means and the correlation signal generator means of the initial acquisition circuit. Another difference is that the number of correlation steps of the correlator is N stages equivalent to N chips of one cycle of the PN signal, and that the sampling signal generator means is designed so as to produce a sampled signal by sampling the center of the chip waveform.

In the case where four correlators are used in the second embodiment, there are secured 4N stages, the same as the first embodiment in which two correlators, each having 2N stages, are used, because of the correlation number N of each correlator. Accordingly, the configuration of the second embodiment does not result in bulky correlators.

The configuration of the second embodiment and initial acquisition operation will be described with reference to FIGS. 5A and 5B.

In the explanation given below, as with the previously described first embodiment, assume that the phase difference between the carrier wave of the received signal 1 and the carrier wave outputted from the voltage controlled carrier wave oscillator 42 is $\theta$.

Figure 6:
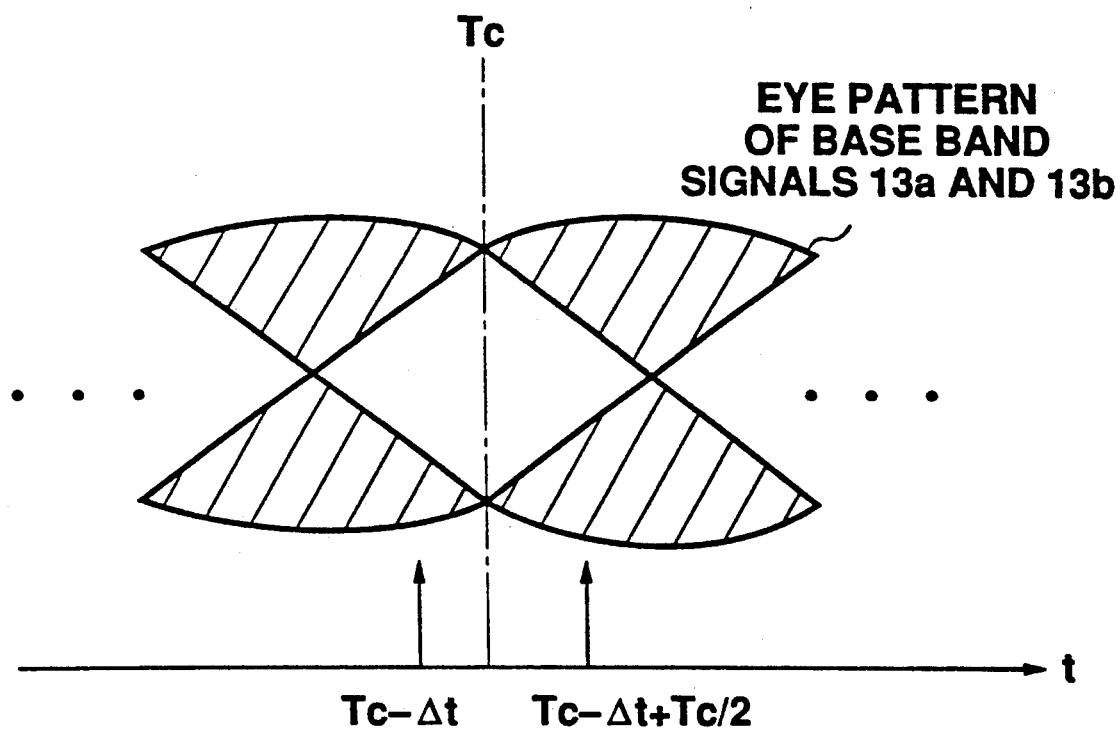
FIG. 6 is a diagrammatic representation illustrating a sampling timing.
Figure 7:
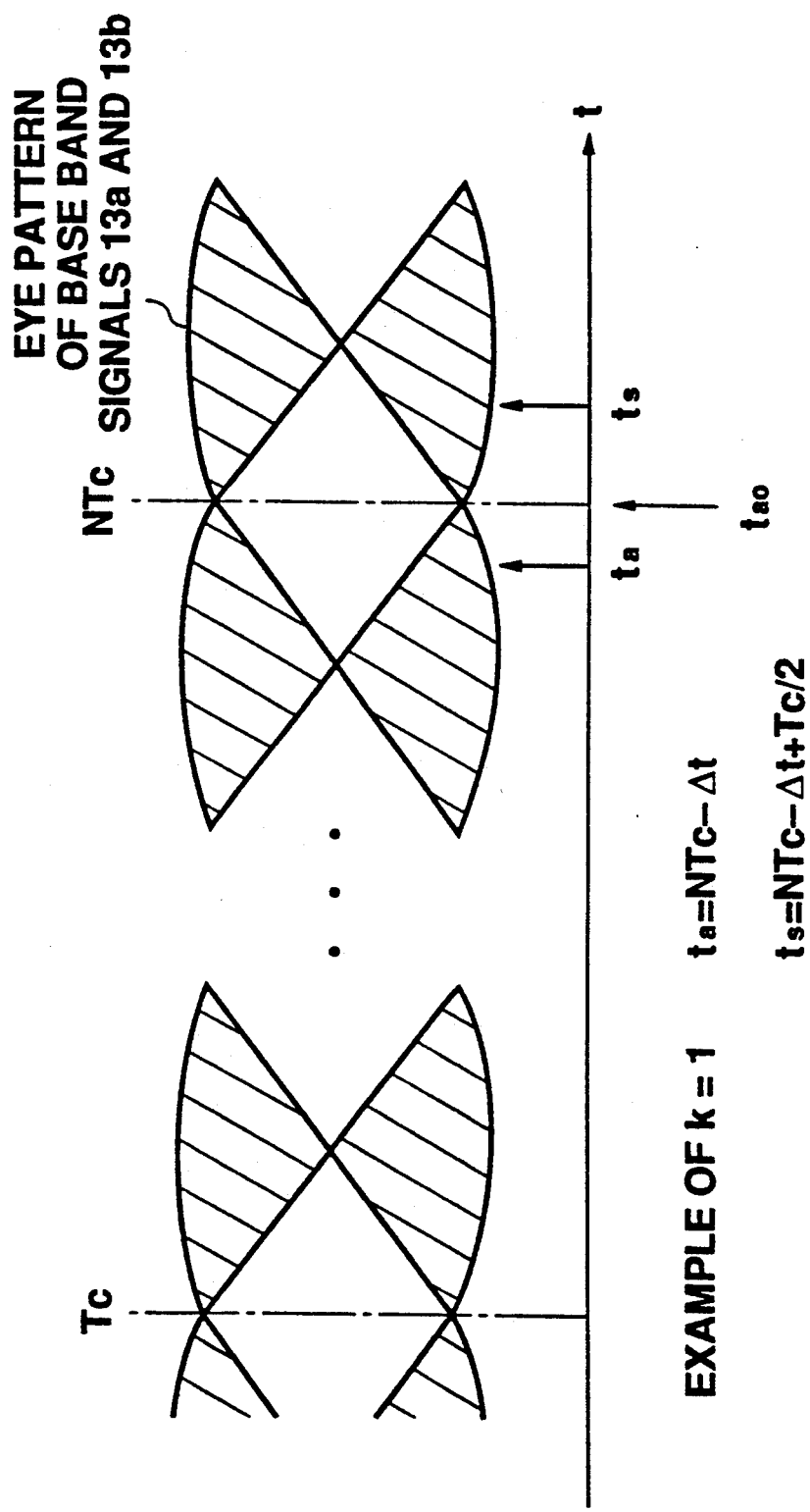
FIG. 7 is a diagrammatic representation illustrating a sampling timing.

The base band signals 13a and 13b are respectively divided into two, and one half of each is sampled once every one chip by means of the sampling circuits 14A and 14B in response to the chip clock 49b having a rate of the PN signal and is then output as the sampled signals 14a and 14b, respectively. A sampling timing will be described by reference to FIGS. 6 and 7 hereinbelow.

Consider that the time $t=iTc$, $(i=1, 2, \ldots)$ is the center of each chip waveform and sampling is effected at the time $t$ ($=iTc-\Delta t$), the sampled signals 14a and 14b are respectively expressed as $$d(iTc-\Delta t)c_i h(-\Delta t)\cos\theta \tag{38}$$

$$d(iTc-\Delta t)c_i h(-\Delta t)\sin\theta \tag{39}$$

The correlators 15A and 15B respectively connected to the sampling circuits 14A and 14B produce a correlation between the PN signal components included in the sampled signal and the reference PN signal concerning each of the sampled signals 14a and 14b which have been sampled within one cycle of the PN signal. The PN signal component of the correlation signals 15a and 15b is eliminated at a time ta ($-kNTc\Delta t$), ($k=1, 2 \ldots$) when the PN signal component included in the sampled signal and the reference PN signal are in phase with each other, and can be expressed by the following equations, respectively.

$$\sum_{i=1}^{N} d((k - 1)NTc + iTc - \Delta t)h(-\Delta t)\cos\theta \tag{40}$$

$$\sum_{i=1}^{N} d((k - 1)NTc + iTc - \Delta t)h(-\Delta t)\sin\theta \tag{41}$$

After having been sampled once per chip by the newly provided sampling circuits 14C and 14D, the other half of the base band signals 13a and 13b is output as the sampled signals 14c and 14d, respectively. Because of receipt of an inverted chip clock 53a which was produced by inverting the chip clock 49b having the rate of the PN signal by means of an inverter 53 at the sampling circuits 14C and 14D, sampling is performed at the time of t ($=iTc-\Delta t+Tc/2$, and the sampled signals 14c and 14d are respectively expressed as $$d(iTc-\Delta t+Tc/2c_i h(-\Delta t+Tc/2\cos\theta \tag{42}$$

$$d(iTc-\Delta t+Tc/2c_i h(-\Delta t+Tc/2\sin\theta \tag{43}$$

The correlators 15C and 15D respectively connected to the sampling circuits 14C and 14d produce a correlation between the PN signal component included in the sampled signal and the reference PN signal concerning the respective sampled signals 14c and 14d which have been sampled within one cycle of the PN signal. The PN signal components of the correlation signals 15c and 15d are eliminated at the time of ts ($=kNTc-\Delta t+Tc/2$) when the PN signal components included in the sampled signal and the reference PN signal are in phase with each other, and can be respectively expressed by the following equations.

$$\sum_{i=1}^{N} d((k - 1)NTc + iTc - \Delta t + Tc/2) \times h(-\Delta t + Tc/2)\cos\theta \tag{44}$$

$$\sum_{i=1}^{N} d((k - 1)NTc + iTc - \Delta t + Tc/2) \times h(-\Delta t + Tc/2)\sin\theta \tag{45}$$

Because of no variations in the information data within one cycle of the PN signal, consider that d ($(k-1)NTc+iTc-\Delta t$) and d ($(k-1)NTc+iTc-\Delta t+Tc/2$) are $d_k$ (a value of either $-1$ or $+1$), and that the correlation signals 15a and 15b at the time of ta ($=kNTc-\Delta t$) do not cause any variations until the time of tu ($=kNTc-\Delta t+Tc$) after one sampling period, then there are obtained output signals from adders 52A and 52B, each being expressed as $$Nd_k\{h(-\Delta t)+h(-\Delta t+Tc/2)\}\cos\theta \tag{46}$$

$$Nd_k\{h(-\Delta t)+h(-\Delta t+Tc/2)\}\sin\theta \quad (47)$$

After having been squared by the square generators 16A and 16B, the output signals from the adders 52A and 52B are output as the correlation pulse signal 24a by being summed together at the adder 23A. This correlation pulse signal 24a at the time of ts ($=kNTc-\Delta t+Tc/2$) when the PN signals are matched with each other has a large value, and is represented as $$N^2\{h(-\Delta t)+h(-\Delta t+Tc/2)\}^2 \quad (48)$$

Upon receipt of the correlation pulse signal 24a at the decision device 25, the acquired signal 3 is generated, thereby completing the initial acquisition operation.

The tracking operation of the second embodiment will be explained hereunder.

After having been squared by means of the square generators 16C and 16D, the correlation signals 15c and 15d are summed by the adder 23B to produce the correlation pulse signal 24b. As has been described above, the correlation signals 15c and 15d at the time of ts ($=kNTc-\Delta t+Tc/2$) are respectively expressed as $$Nd_k h(-\not = t+Tc/2)\cos\theta \quad (49)$$

$$Nd_k h(-\Delta t+tc/2)\sin\theta \quad (50)$$

Hence, the correlation pulse signal 24b at the time of ts is expressed as $$R_L(\Delta t)=N^2\{h(-\Delta t+Tc/2)\}^2 \quad (51)$$

The correlation pulse signal 24b at one sampling period prior to the sampling time of ts (=before a Tc period) is expressed by $R_E(\Delta t)$ in the following equation.

$$R_E(\Delta t)=N^2\{h(-\Delta t-Tc/2)\}^2 \quad (52)$$

In this invention, the error signal having the time discrimination characteristic for tracking use is produced from the two correlation pulse signals $R_L(\Delta t)$ and $R_E(\Delta t)$.

Dividing the correlation pulse signal 24b into two and delaying one of them by the period of Tc by means of the delay element 43 results in the input signal $R_L(\Delta t)$ of the subtracter 44 and the output $R_E(\Delta t)$ from the delay element 43 at the sampling time of ts. Accordingly, the output signal $R(\Delta t)$ of the subtracter is expressed as $$R(\Delta t)=R_E(\Delta t)-R_L(\Delta t) \quad (53)$$

Hereinbelow, the time discrimination characteristics of the output signal $R(\Delta t)$ will be described.

Assuming that the low-pass filters 13A and 13B have a cosine roll-off characteristic, the unit pulse waveform for a chip h ($t_0$) is given below with the roll-off factor of $\alpha$.

$$h(t_0) = [\{\sin(\pi t_0/Tc)\}/(\pi t_0/Tc)] \times [\{\cos(\pi\alpha t_0/Tc)\}/\{1-(2\alpha t_0/Tc)^2\}] \quad (54)$$

Figure 8:
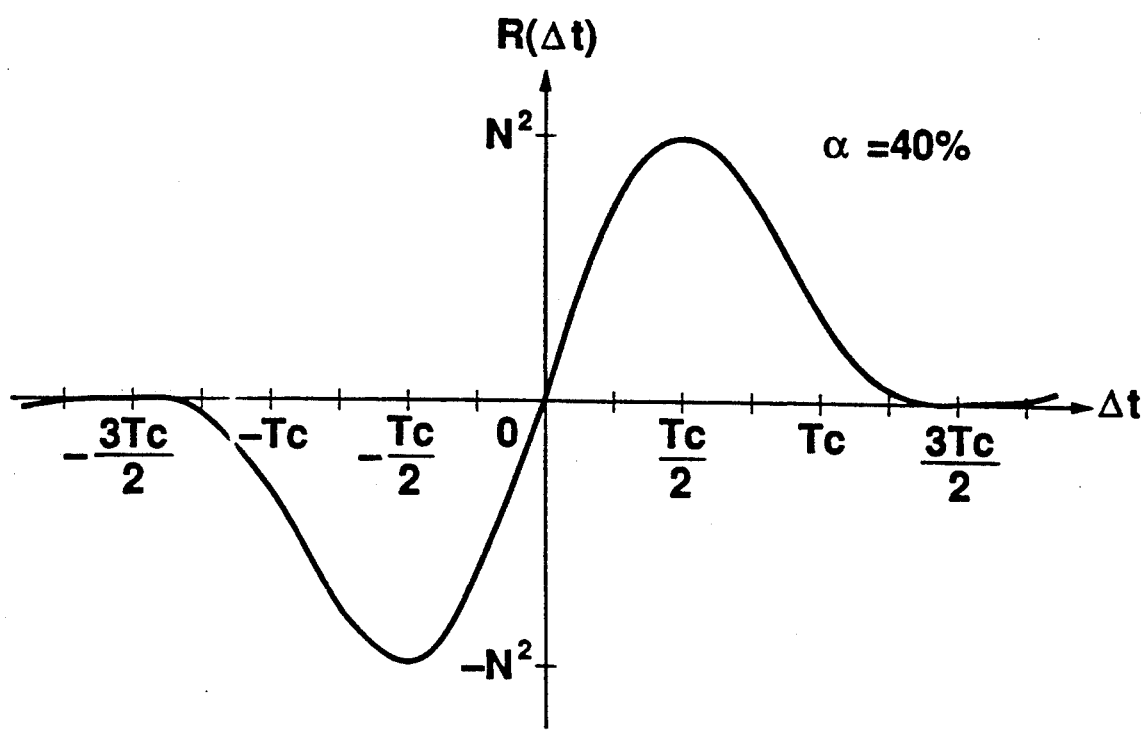
FIG. 8 is a graphical representation of the amplitude of the error signal for tracking use shown in FIG. 5.

FIG. 8 shows the amplitude characteristic of the output signal $R(\Delta t)$ of the subtracter 44 when $\alpha=0.4$ (a roll-off factor of 40%), as an example.

As can be seen from FIG. 8, as with the previous first embodiment, it is possible to produce from the correlation pulse signal 24 the error signal having the appropriate time discrimination characteristic.

Since the time discrimination characteristic is obtained every sampling time of ts ($=kNTc-\Delta t+Tc/2$), (k=1, 2, ...), that is, one cycle of the PN signal, the discrimination characteristic can be extracted by the utilization of the data clock 45a in synchronism with one cycle of the PN signal.

This data clock 45a is generated by means of the data clock generator circuit 45.

This data clock generator circuit 45 generates the data clock 45a having a rising edge at the time of ta by frequency dividing the chip clock 49b in response to the acquired signal 3 that was produced at the sampling time of ts when the PN signal included in the received signal and the reference PN signal are matched with each other. This data clock 45a is delayed by the delay circuit 46 having a delay time of Tc/2, and is eventually output as a data clock having a rising edge the time of ts.

The error signal latch circuit 47 latches an input signal at the rise time ts of the data clock. Upon latching the error signal R ($\Delta t$) at the time ts, the error signal latch circuit 47 outputs the error signal 47a having the proper time discrimination characteristic shown in FIG. 8 every one cycle of the PN signal.

After having been subjected to noise elimination by the loop filter 36, the thus obtained error signal 47a is transmitted to the voltage controlled oscillator 49B. The voltage controlled oscillator 49B generates the chip clock 49b having a frequency of the chip rate corresponding to the voltage of the error signal 48. This chip clock 49b is divided into two, and one half is transmitted to the correlators 15A and 15B which are respectively connected to the sampling circuits 14A and 14B so as to activate the correlators. The other half of the chip clock 49b is inverted by the inverter 53 and is output as the inverted chip clock 53a. The thus inverted chip clock is then transmitted to the correlators 15C and 15D which are respectively connected to the sampling circuits 14C and 14D so as to activate the correlators.

The tracking operation set forth above is performed so as to render the error signals 47a and 48 zero, and hence the tracking point is t=0. Namely, tracking is effected when the sampling time of the sampling circuits 14A and 14B locates at the center of the sampling waveform, that is $ta_0$ (=iTc), (i=1, 2, ...).

Demodulation of information data will now be described hereunder.

In a tracking state, since the sampling circuits 14A and 14B are sampling with use of the chip clock 49b in synchronism with the center of the chip waveform, the correlation signals 15a and 15b at the sampling timing of $ta_0$ (=kNTc), (k=1, 2, ...) when the PN signals are matched with each other can be expressed as $$Nd_k(0)\cos\theta \quad (55)$$

$$Nd_k h(0)\sin\theta \quad (56)$$

From these expressions, it can be seen that the information data component of $d_k$ is extracted from the correlation signal 15a by controlling the phase difference 8 of the carrier wave to be 0 or $\pi$ (rad).

The carrier wave control circuit 50 acquires the correlation signals 15a and 15b in response to the synchronized data clock 45a having a rising edge at the sampling time of $ta_0$ (=kNTc), (k=1, 2, ...), and generates a control voltage in such a manner as to shift the phase of the output carrier wave from the voltage controlled carrier wave oscillator 42 to $\theta = 0$ or $\pi$ (rad).

This operation is achieved by generating a signal expressed as follows which includes information about the phase difference $\theta$ of the carrier wave by multiplication of the correlation signals 15a and 15b, for instance.

$$N^2\{h(0)\}^2 \sin 2\theta \tag{57}$$

Activating the voltage controlled carrier wave oscillator 42 by use of the above signal as a control signal causes the carrier wave outputted from the voltage controlled carrier wave oscillator 42 to be in synchronism with the carrier wave of the received signal 1 having the phase angle of zero or $\pi$ (rad). The correlation signal 15a at the time of $t_{a_0}$ ($=kNTc$), ($k = 1, 2, ...$) is latched by the data clock 45a in the latch circuit 51, thereby producing the demodulated data 10.

The demodulated data 10 obtained by the present invention contains h (0) component. This means that data demodulation is effected by the sampled signal obtained by having sampled the center of the chip waveform. This results in demodulated data having a signal-to-noise ratio free from deterioration due to sampling the chip waveform at any point other than the center thereof.

Third Embodiment

Figure 9A:
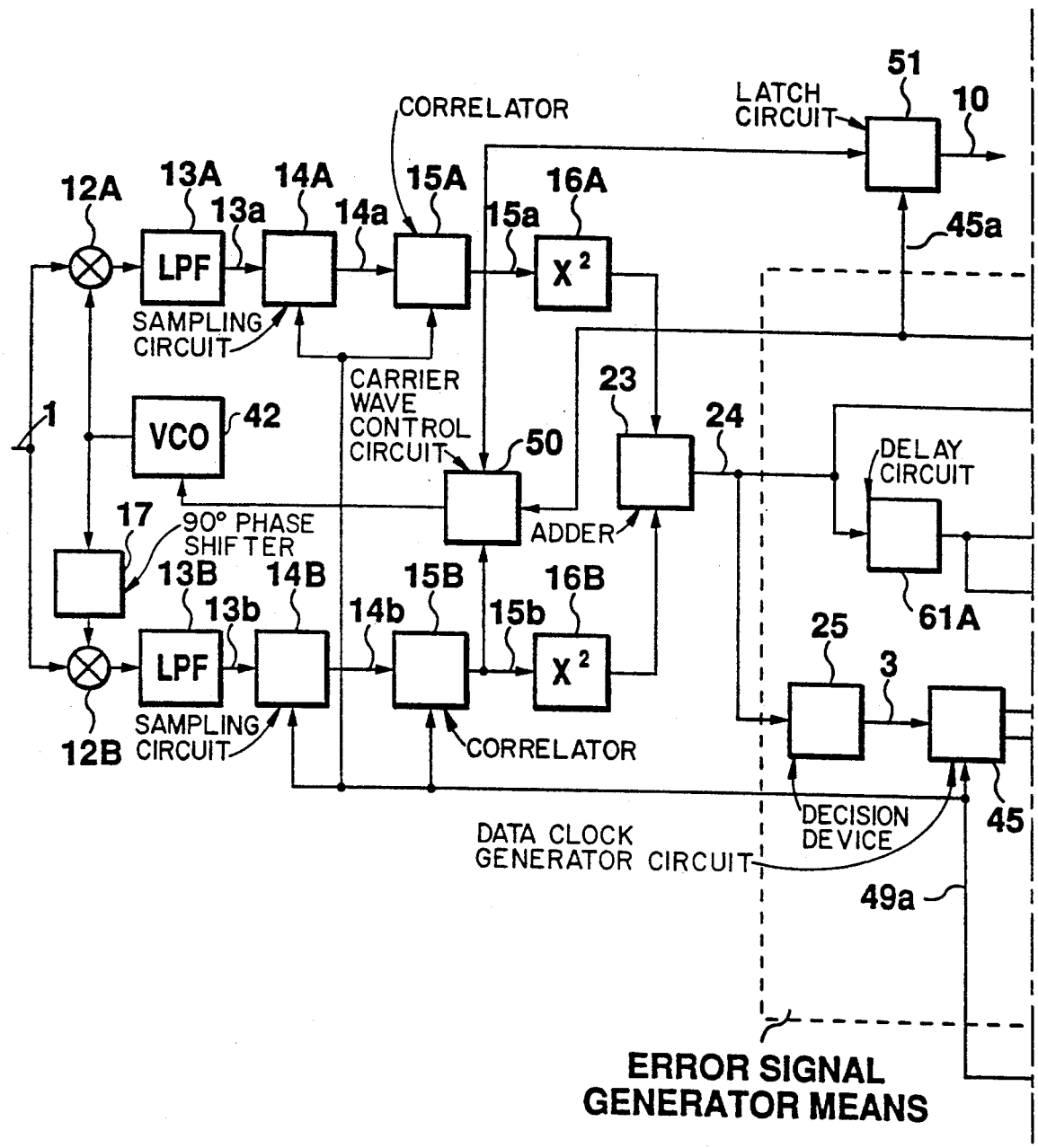
FIGS. 9A and 9B together are schematic representation of the configuration of a spread spectrum demodulator according to a third embodiment of this invention.
Figure 9B:
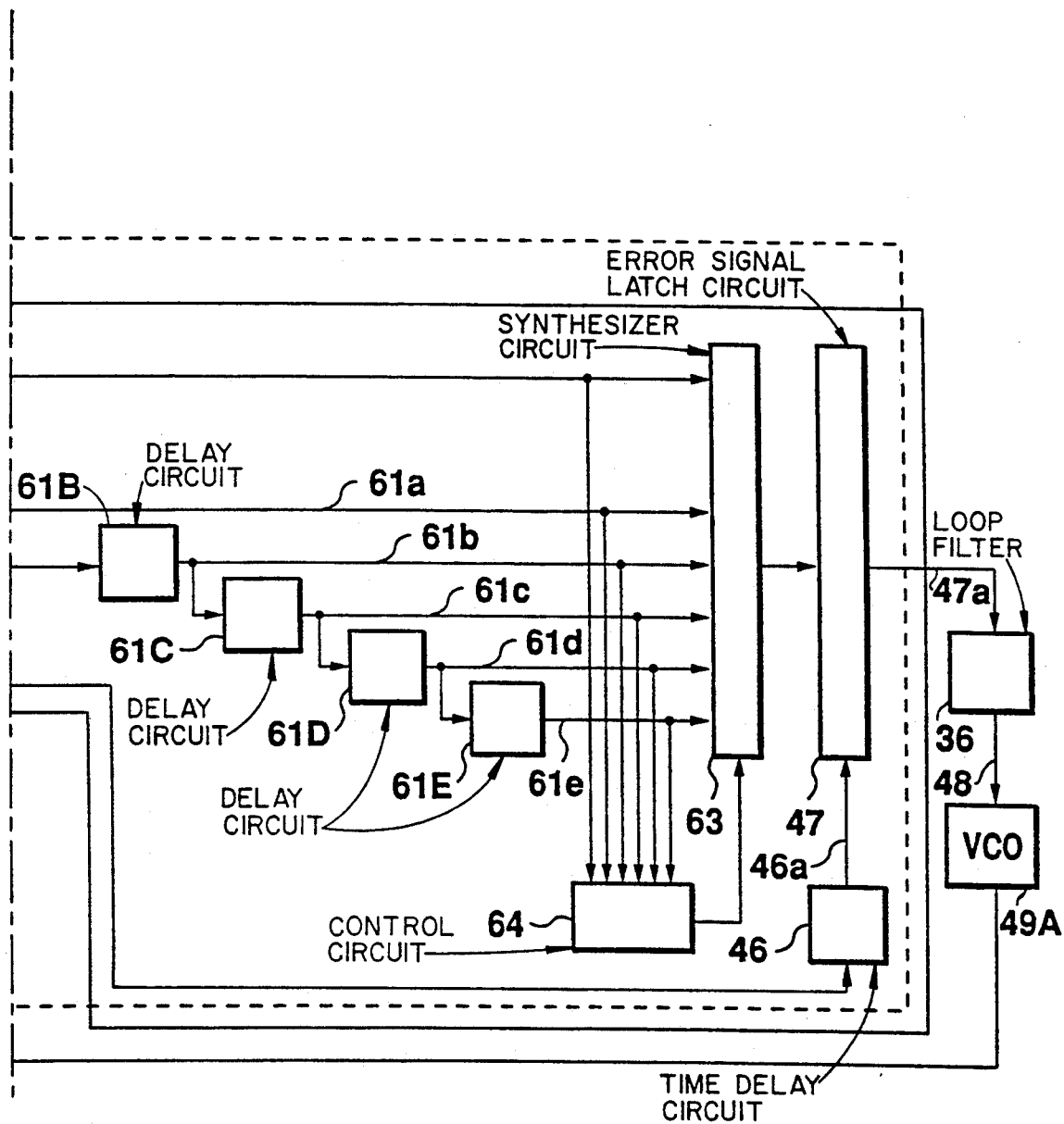

FIGS. 9A and 9B are a schematic diagram of a spread spectrum demodulator according to a third embodiment of this invention.

In FIGS. 9A and 9B, reference numerals 61A, 61B, 61C, 61D, and 61E designate delay circuits for delaying a correlation pulse signal for a Tc period; and 61a, 61b, 61c, 61d, and 61e, correlation pulse signals delayed by the delay circuits. Reference numeral 63 designates a synthesizer circuit for producing an error signal by the composition of the correlation pulse signal 24 and the delayed correlation pulse signals 61a, 61b, 61c, 61d and 61e; 64, a control circuit for controlling the synthesizer circuit 63; and 47a and 48 composite error signal produced by the synthesizer circuit 63.

The operation of the circuit shown in FIGS. 9A and 9B will be described with reference to FIGS. 10 and 11.

Figure 10:
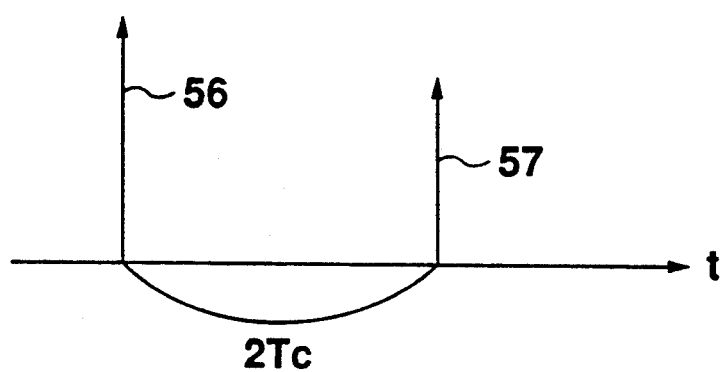
FIG. 10 is a diagram showing one example of a receiving timing of multipath waves.

FIG. 10 diagrammatically illustrates an example of a receiving timing of the multipath waveform wherein the number of the multipath waveforms is two and the difference in propagation time between them is 2Tc.

In FIG. 10, reference numeral 56 designates a leading waveform which is received earlier among the two multipath waveforms; and 57, a delayed waveform received later among the two multipath waveforms.

Figure 11:
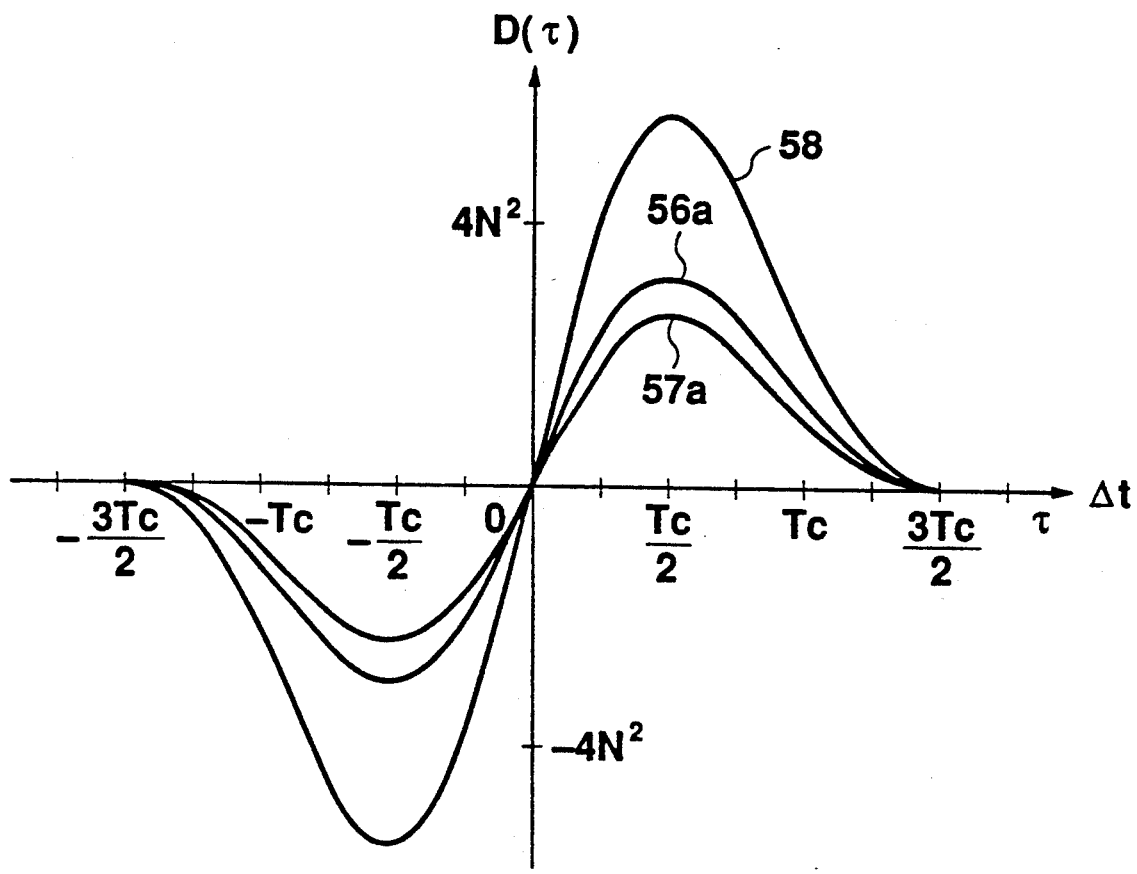
FIG. 11 is a graphical representation of the amplitude of the error signal for tracking use shown in FIG. 9.

FIG. 11 is a graph showing the amplitude characteristic of the error signal for tracking shown in FIG. 9B. In FIG. 11, reference numeral 56a designates an error signal generated from the leading waveform 56; 57a, an error signal generated from the delayed waveform 57; and 58, an error signal produced by the composition of the error signals generated from the leading 56 and delayed 57 waveforms.

Given that the leading correlation pulse signal and the delayed correlation pulse signal resulting from the correlation processing of the leading waveform 56 are produced concurrently by means of the delay circuit 61C, the leading correlation pulse signal will be denoted by the reference numeral 61c and the delayed correlation pulse signal 61b.

The synthesizer circuit 63 generates an error signal by subtraction of these two correlation pulse signals. As a result of this, there will be obtained the error signal 57a which is identical with the error signal produced by the spread spectrum demodulator shown in FIG. 1.

Because of the delay of 2Tc between the leading correlation pulse signal and the delayed correlation pulse signal resulting from the correlation processing of the delayed waveform 57, both correlation signals are denoted by the reference numerals 61a and 24 which are delayed by 2Tc when compared with the signals 61c and 61b.

The synthesizer circuit 63 can produce, by the subtraction of these two correlation pulse signals, an error signal for the delayed waveform that can never be obtained by the spread spectrum demodulator shown in FIG. 1.

The thus obtained error signal is denoted by the reference numeral 57a in FIG. 11. The synthesizer circuit generates the synthesized error signal 58 by summation of the two error signals 56a and 57a.

The operation of the control circuit 64 will now be explained.

In the above example, the correlation pulse signals other than 24, 61a, 61b, and 61c, namely the correlation signals 61d and 61e, are zero, and hence the control circuit controls the synthesizer circuit so as not to effect composition of the signals 61d and 61e. Practically, since the composition of the signals 61d and 61e which do not contain signal components other than noise in the case of the received signal containing noise causes adverse effects on the tracking characteristic due to reduction in the signal-to-noise ratio of the synthesized error signal 47a, it should be noted not to produce a synthesized correlation pulse signal which contains only noise.

The operation of the control circuit when a sharp drop occurs in the signal level of the multipath waveform will be described.

An abrupt decline to zero in the signal level of the leading waveform 56 due to, for instance, interruption by buildings leads to a sudden drop to zero in the amplitude of the correlation pulse signals 61b and 61c as well as an instantaneous fall to zero in the amplitude of the error signal 56a. Even in such a case, however, the presence of correlation pulse signals 24 and 61a produced from the delayed waveform 57 prevents the amplitude of the error signal 57a that is produced from the correlation pulse signals 24 and 61a from dropping to zero, and thereby a locking-off free error signal can be obtained.

A transversal filter provided in the error signal generator means of the spread spectrum of the present invention will be explained.

Figure 12:
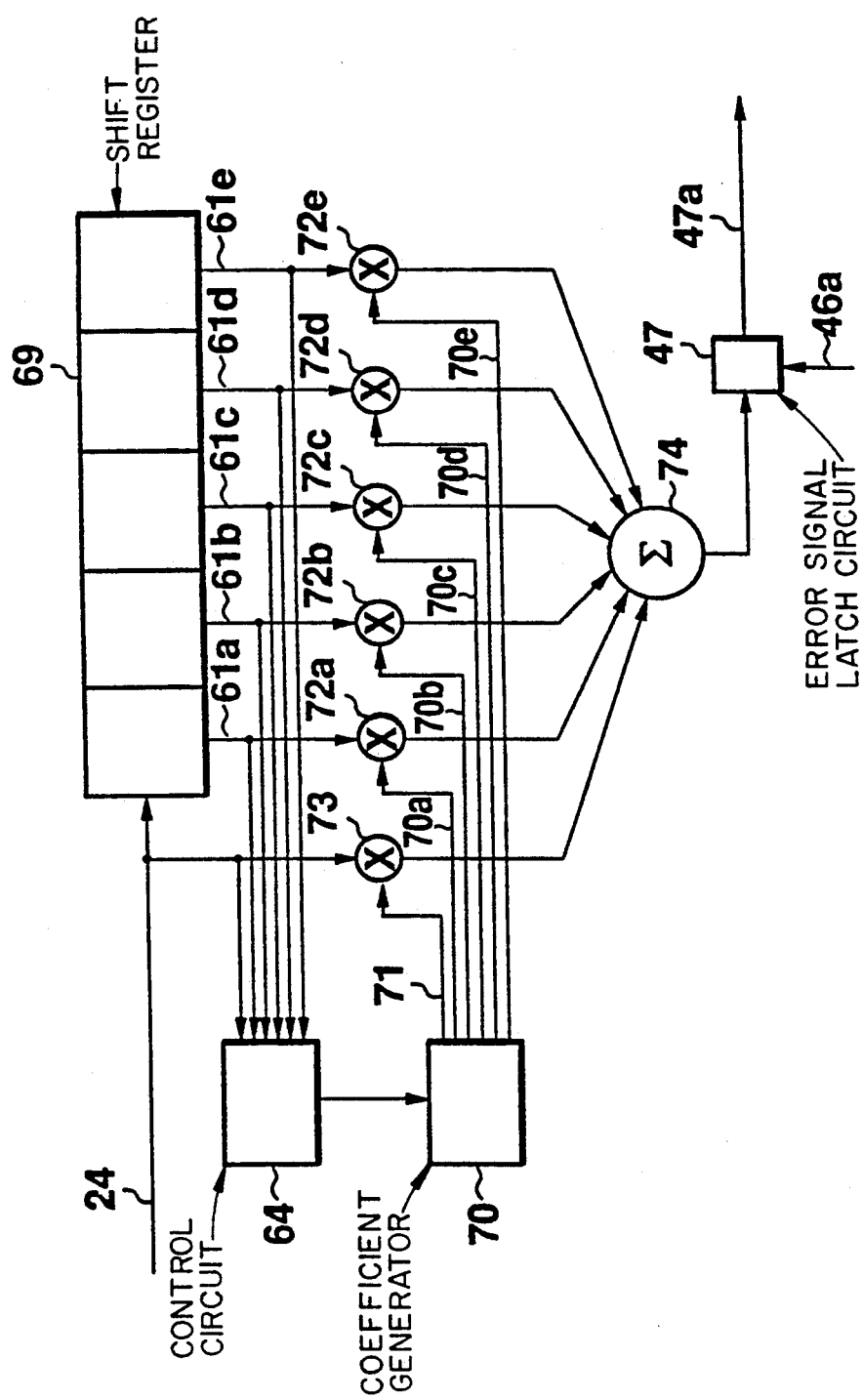
FIG. 12 is a diagrammatic representation illustrating a transversal filter shown in FIG. 9.

In FIGS. 9A and 9B, the circuit consisting of the plurality of delay circuits 61A, 61B, 61C, 61D, 61E, the synthesizer circuit 63 and the control circuit 64 are equivalent to the transversal filter shown in FIG. 12.

In FIG. 12, reference numeral 69 designates a shift register having a delay time of Tc at the first stage; 70, a coefficient generator for generating a coefficient used when weighting a delayed correlation pulse signal; 70a, 70b, 70c, 70d, 70e, and 71, coefficients generated by the coefficient generator 70; 72a, 72b, 72c, 72d, 72e, and 73, multipliers for multiplying each delayed correlation pulse signal by each coefficient; and 74, an adder.

The operation of the synthesizer circuit 63 and the control circuit 64 that has already been set forth above will be represented as follows by coefficients outputted from the coefficient generator 70.

coefficient 71 = −1 coefficient 70a = +1 coefficient 70b = −1 coefficient 70c = +1 coefficient 70d = 0 coefficient 70e = 0

The correlation pulse signals thus weighted by these coefficients are added by the adder 74, and thereby the error signal 47a is produced.

A control method for generating coefficients will now be explained.

In the above explanation, there are employed an integral value for the coefficients for simplicity of explanation. The transversal filter improves the signal-to-noise ratio of the synthesized signal by varying the value of the coefficient in response to the signal level. In other words, a signal having a large signal level is multiplied by a large coefficient value whereas a signal having a small value is multiplied by a small coefficient value.

Thus, upon detection of the level of the correlation pulse signals 24, 61a, 61b, 61c, 61d, and 61e, the control circuit 64 determines a coefficient corresponding to each level, thereby improving the signal-to-noise ratio of the
synthesized error signal 47a.

Fourth Embodiment

In the third embodiment, the control circuit 64 for controlling the coefficient generator 70 of the transversal filter is constituted in such a way as to directly detect the level of the correlation pulse signal whilst in the fourth embodiment the control circuit 64 is arranged so as to detect the level of the correlation signal after having performed integration of the correlation pulse signal for a given period.

Figure 13:
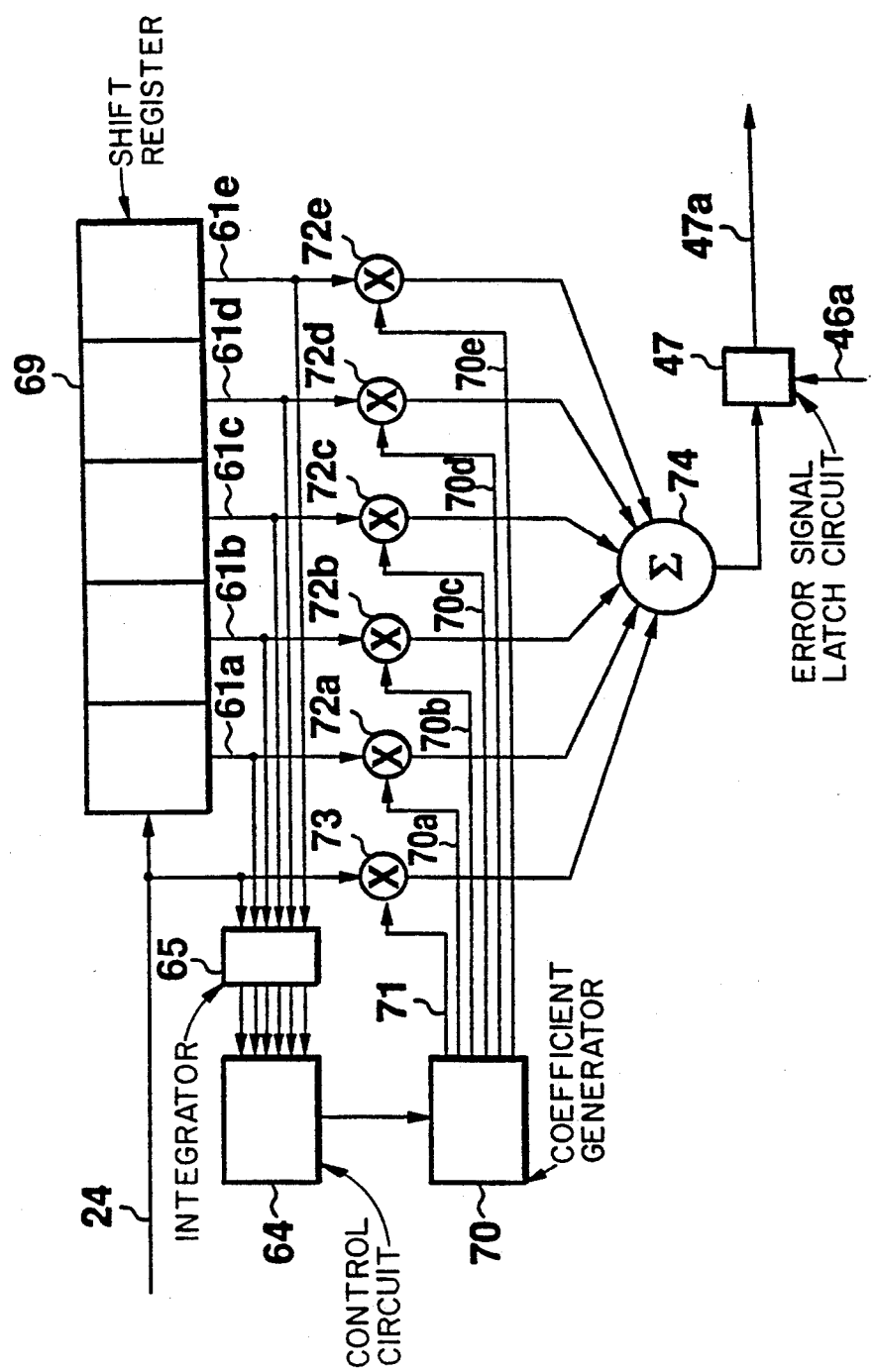
FIG. 13 is a schematic representation of the configuration of a transversal filter according to a fourth embodiment of this invention.

FIG. 13 shows the configuration of the transversal filter of the spread spectrum demodulator according to a fourth embodiment. In FIG. 13, reference numeral 65 designates an integrator for performing integration of the correlation pulse signal for a given period. According to the present invention, in the case of the received signal containing noise, the signal-to-noise ratio of the correlation pulse signal to be transmitted to the control circuit 64 is improved by the integrator 65, and hence the coefficient generator 70 has an immunity against noise in operation. As a result of this, the signal-to-noise ratio of the error signal 47a is enhanced, and the tracking operation is stabilized.

Fifth Embodiment

As an alternative to the transversal filter according to the third and fourth embodiments, having an arrangement for effecting weighting by use of the multipliers 72a, 72b, 72c, 72d, 72e, and 73, there will be described in a fifth embodiment an example wherein a transversal filter has switches and inverter instead of the multipliers.

Figure 14:
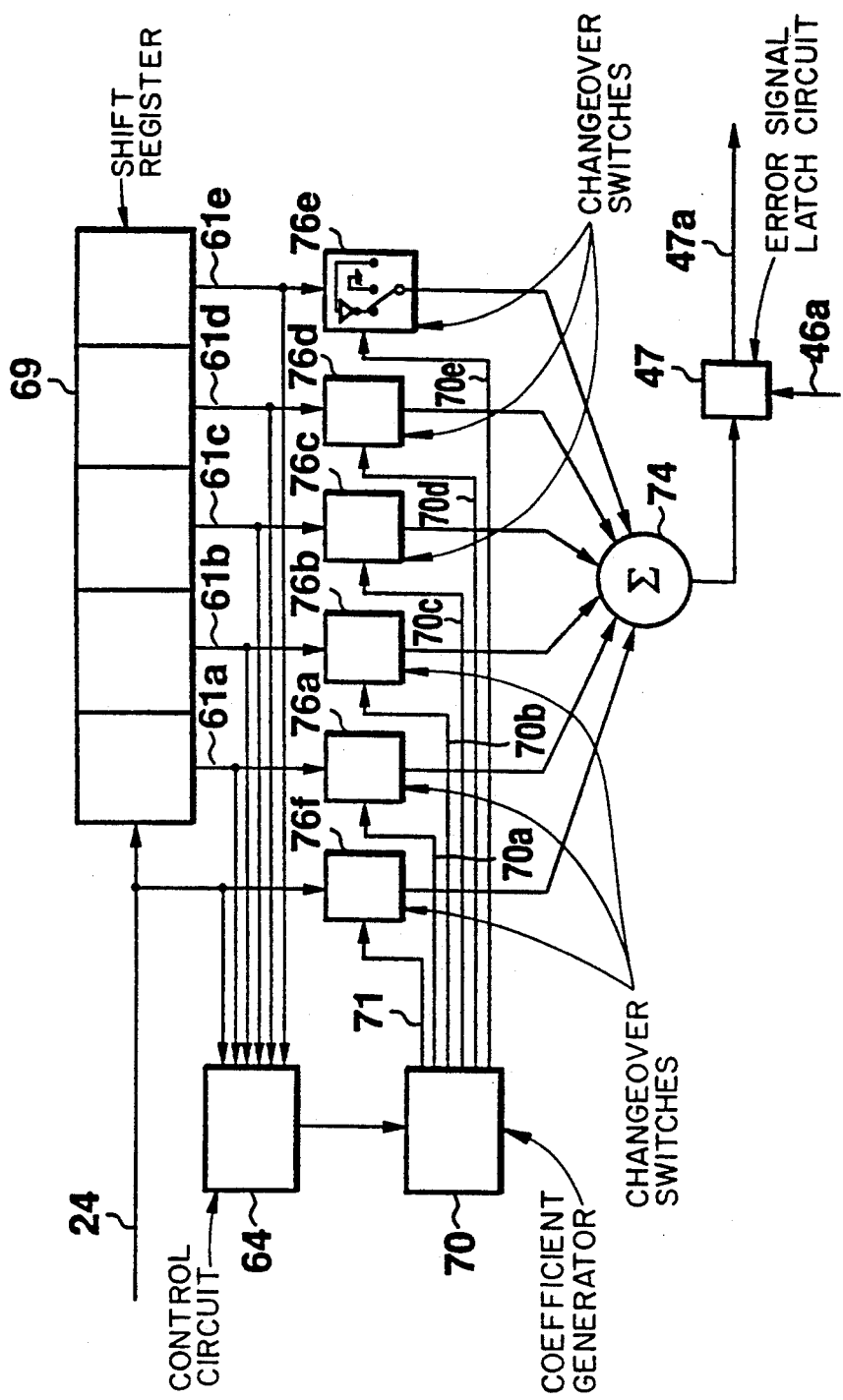
FIG. 14 is a schematic representation of the configuration of a transversal filter according to a fifth embodiment of this invention.

FIG. 14 illustrates the configuration of a transversal filter of a spread spectrum demodulator according to the fifth embodiment. In FIG. 14, reference numerals 76a, 76b, 76c, 76d, 76e, and 76f designate changeover switches, each being provided with a switch and an inverter.

The control circuit 64 performs a control in such a manner that the coefficient generator 70 generates any one of three signals, for example −1, 0, 1, in response to the signal level of the correlation pulse signal. Corresponding to the three signals −1, 0, and 1 from the coefficient generator 70, the switches enter one of three possible states. Eventually, the correlation pulse signal is multiplied by −1, 0, or 1 and synthesized.

According to the fifth embodiment, weighting by use of the changeover switches provided with a simple switch and an inverter instead of the multipliers leads to compact hardware.

Sixth Embodiment

Figure 15:
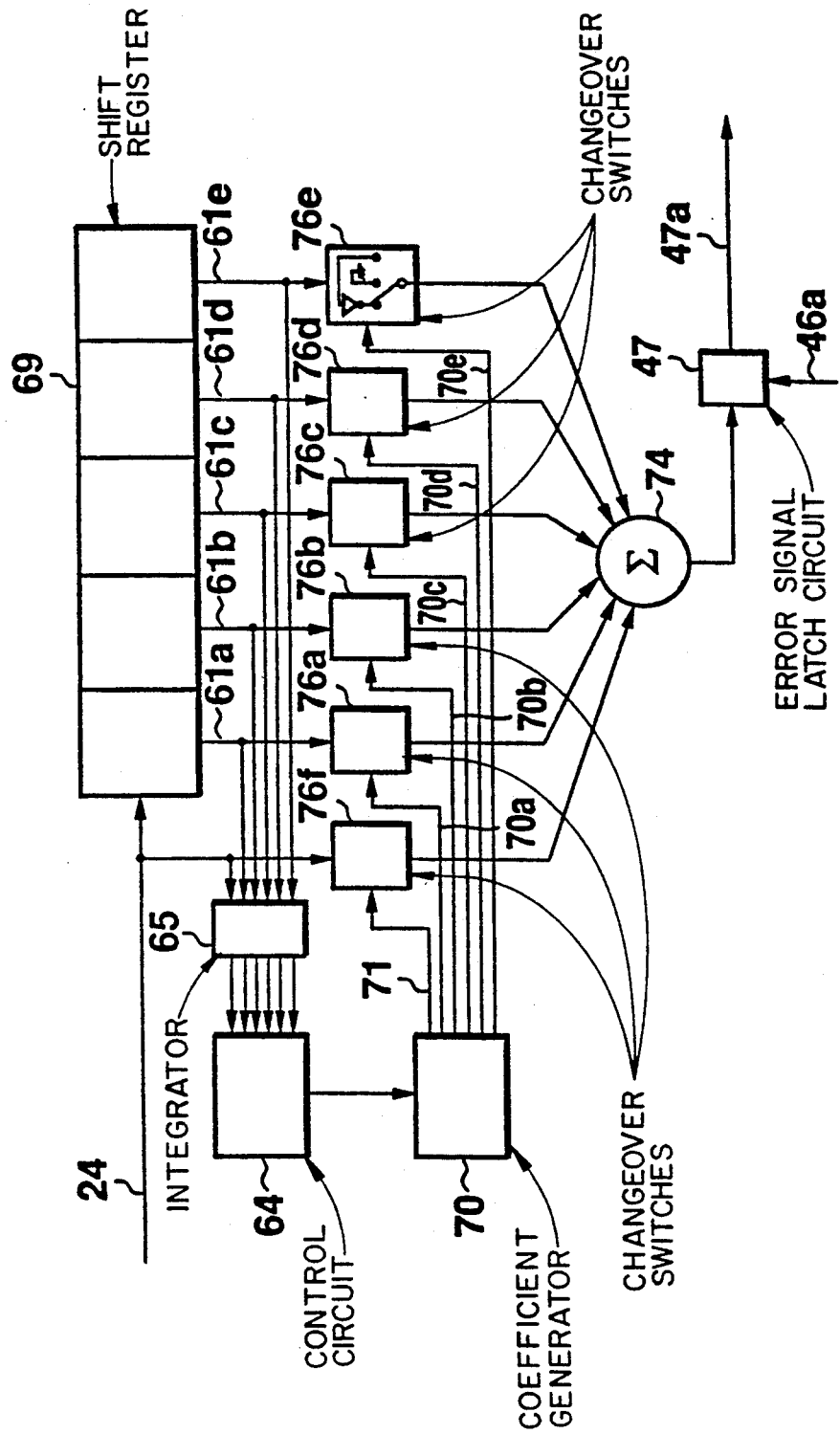
FIG. 15 is a schematic representation of the configuration of a transversal filter according to a sixth embodiment of this invention.

In a sixth embodiment, a transversal filter is constituted by the combination of the fourth and fifth embodiments. FIG. 15 shows the configuration of a transversal filter of a spread spectrum demodulator according to the sixth embodiment.

In the sixth embodiment, there is employed the configuration wherein the control circuit 64 detects the level of a correlation signal after having integrated the correlation signal for a given period to provide a high resistance against noise. Using the changeover switches provided with the switch and inverter instead of the multipliers allows the size of the hardware to be reduced.

As described above, according to this invention, the generation of the correlation pulse signal from the correlation pulse signal generator means that the error signal having time discrimination characteristics used in tracking results in omitting the operation for eliminating the PN signal component from the conventional tracking circuit and so the spread spectrum demodulator can be made simple in configuration and compact in size.

Further, according to this invention, generating error signals by the composition of the plurality of correlation pulse signals using the transversal filter along the transmission path where the multipath waveform is present results in a spread spectrum demodulator which is capable of maintaining the tracking without causing a locking-off during the tracking even when sudden variations occur in the level of the multipath waveform.

The various features and advantages of the invention are thought to be clear from the foregoing description. However, various other features and advantages not specifically enumerated will undoubtedly occur to those versed in the art, as likewise will many variations and modifications of the embodiments illustrated herein, all of which may be achieved without departing from the spirit and scope of the invention as defined by the appended claims.

What is claimed is:

1. A spread spectrum demodulator for use with a phase-shift-keying modulated spread spectrum signal for demodulating data from a received signal, said spread spectrum demodulator comprising:
   a) means for generating a correlation pulse signal in response to a received signal whose spectrum is spread by a pseudonoise signal; and
   b) means for effecting tracking, responsive to the means for generating, including a means for generating an error signal having a time discrimination characteristic, said means for generating the error signal further including:

i) a transversal filter wherein the error signal output from said transversal filter is derived from filtering a plurality of correlation pulse signals which are each weighted by a coefficient for weighting use and wherein said coefficient for weighting use is derived from integrating a correlation pulse signal for a predetermined period.

2. A spread spectrum demodulator for use with a phase-shift-keying modulated spread spectrum signal for demodulating data from a received signal whose spectrum is spread by a pseudonoise signal, the spread spectrum demodulator comprising:

a) base band signal generator means for outputting a base band signal, including a means for receiving the received signal and for waveform-shaping the received signal into the base band signal;

b) sampled signal generator means for outputting a sampled signal, including a means for receiving the base band signal and for sampling the base band signal into the sampled signal;

c) correlator signal generator means for outputting a correlation signal, responsive to a means for generating a reference pseudonoise signal, said first generator means including a means for receiving the sampled signal and for comparing the phases of a pseudonoise component of the sampled signal and the reference pseudonoise signal, and means for generating the correlation signal when the signals are in phase;

d) correlation pulse signal generator means for outputting a correlation pulse signal, including a means for receiving the correlation signal and means for removing the data component from the correlation signal thereby producing the correlation pulse signal, each cycle of the pseudonoise signal;

e) error signal generator means for outputting an error signal, including a means for receiving the correlation pulse signal and for generating the output error signal whose level aries in response to the phase difference between the pseudonoise component of the sampled signal and the reference pseudonoise signal;

f) clock generator means, including a means for receiving the error signal and a means for generating and outputting a chip clock signal, in response to the error signal, in synchronism with the received signal; and g) data extracting means for outputting demodulated data, including a means for receiving the correlation signal and means for extracting data from the correlation signal thereby producing demodulated data.

3. A spread spectrum demodulator according to claim 2, wherein the error signal generator means comprises a filter, and the output error signal from said filter is derived from filtering a plurality of correlation pulse signals.

4. A spread spectrum demodulator according to claim 3, wherein a coefficient for weighting use is derived from the correlation pulse signal which was integrated for a predetermined period.

5. A spread spectrum demodulator according to claim 3, wherein the filter performs weighting by means of a changeover switch, said changeover switch consisting of a switch and an inverter.

6. A spread spectrum demodulator according to claim 3, wherein a coefficient for weighting use is derived from the correlation pulse signal which was integrated for a predetermined period, and wherein the filter performs weighting by means of a changeover switch, said change over switch consisting of a switch and an inverter.

7. A spread spectrum demodulator according to claim 2, wherein the means for extracting data is comprised of a carrier wave control circuit for generating and outputting, from the correlation signal, a signal including information about the phase of a carrier wave of the received signal and a voltage controlled carrier wave generator for generating and outputting, from the signal including the information about the phase of the carrier wave, a carrier wave in phase with the carrier wave of the received signal.

8. A spread spectrum demodulator according to claim 2, wherein the error signal generator means comprises a transversal filter, and the output error signal from said filter is derived from filtering a plurality of correlation pulse signals.

9. A spread spectrum demodulator according to claim 1, wherein a coefficient for weighting use is derived from the correlation pulse signals which were integrated for a predetermined period.

10. A spread spectrum demodulator according to claim 8, wherein the transversal filter performs weighting by means of a changeover switch, said changeover switch consisting of a switch and an inverter.

11. A spread spectrum demodulator according to claim 8, wherein a coefficient for weighting use is derived from the correlation pulse signal which was integrated for a predetermined period, and wherein the transversed filter performs weighting by means of a changeover switch, said changeover switch consisting of a switch and an inverter.

* * * * *